United States Patent
Phatak et al.

(10) Patent No.: US 11,948,553 B2
(45) Date of Patent: Apr. 2, 2024

(54) SYSTEMS AND METHODS OF SPEAKER-INDEPENDENT EMBEDDING FOR IDENTIFICATION AND VERIFICATION FROM AUDIO

(71) Applicant: PINDROP SECURITY, INC., Atlanta, GA (US)

(72) Inventors: Kedar Phatak, Atlanta, GA (US); Elie Khoury, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 196 days.

(21) Appl. No.: 17/192,464

(22) Filed: Mar. 4, 2021

(65) Prior Publication Data
US 2021/0280171 A1    Sep. 9, 2021

Related U.S. Application Data

(60) Provisional application No. 62/985,757, filed on Mar. 5, 2020.

(51) Int. Cl.
*G10L 15/06* (2013.01)
*G06N 3/045* (2023.01)
(Continued)

(52) U.S. Cl.
CPC ........... *G10L 15/063* (2013.01); *G06N 3/045* (2023.01); *G06N 20/00* (2019.01); *G10L 15/16* (2013.01); *G10L 25/27* (2013.01)

(58) Field of Classification Search
CPC ....... G10L 15/063; G10L 15/16; G10L 25/27; G10L 17/00; G10L 25/78; G10L 25/51;
(Continued)

(56) References Cited

U.S. PATENT DOCUMENTS

| 5,442,696 A | 8/1995 | Lindberg et al. |
| 5,570,412 A | 10/1996 | Leblanc |

(Continued)

OTHER PUBLICATIONS

Yu, H., Tan, Z. H., Ma, Z., Martin, R., & Guo, J. (2017). Spoofing detection in automatic speaker verification systems using DNN classifiers and dynamic acoustic features. IEEE transactions on neural networks and learning systems, 29(10), 4633-4644. (Year: 2017).*

(Continued)

*Primary Examiner* — Huyen X Vo
*Assistant Examiner* — Philip H Lam
(74) *Attorney, Agent, or Firm* — Foley & Lardner LLP

(57) ABSTRACT

Embodiments described herein provide for audio processing operations that evaluate characteristics of audio signals that are independent of the speaker's voice. A neural network architecture trains and applies discriminatory neural networks tasked with modeling and classifying speaker-independent characteristics. The task-specific models generate or extract feature vectors from input audio data based on the trained embedding extraction models. The embeddings from the task-specific models are concatenated to form a deep-phoneprint vector for the input audio signal. The DP vector is a low dimensional representation of the each of the speaker-independent characteristics of the audio signal and applied in various downstream operations.

26 Claims, 14 Drawing Sheets

(51) Int. Cl.
*G06N 20/00* (2019.01)
*G10L 15/16* (2006.01)
*G10L 25/27* (2013.01)

(58) Field of Classification Search
CPC ........ G06N 3/045; G06N 20/00; G06N 3/044; G06N 3/08; G06N 7/01; H04L 63/0861; H04L 63/1466; H04W 12/06; H04W 12/12; H04W 12/69; H04W 12/65; G06F 21/32; G06F 21/554
See application file for complete search history.

(56) References Cited

U.S. PATENT DOCUMENTS

| | | | |
|---|---|---|---|
| 5,724,404 A | 3/1998 | Garcia et al. | |
| 5,825,871 A | 10/1998 | Mark | |
| 6,041,116 A | 3/2000 | Meyers | |
| 6,134,448 A | 10/2000 | Shoji et al. | |
| 6,654,459 B1 | 11/2003 | Bala et al. | |
| 6,735,457 B1 | 5/2004 | Link et al. | |
| 6,765,531 B2 | 7/2004 | Anderson | |
| 7,787,598 B2 | 8/2010 | Agapi et al. | |
| 7,865,873 B1* | 1/2011 | Zoellner | G06F 16/288 715/761 |
| 8,050,393 B2 | 11/2011 | Apple | |
| 8,223,755 B2 | 7/2012 | Jennings et al. | |
| 8,311,218 B2 | 11/2012 | Mehmood et al. | |
| 8,385,888 B2 | 2/2013 | Labrador et al. | |
| 9,060,057 B1 | 6/2015 | Danis | |
| 9,078,143 B2 | 7/2015 | Rodriguez et al. | |
| 10,147,442 B1* | 12/2018 | Panchapagesan | G06N 3/04 |
| 10,257,591 B2 | 4/2019 | Gaubitch et al. | |
| 11,429,865 B1* | 8/2022 | Patton | G06N 3/082 |
| 2002/0181448 A1 | 12/2002 | Uskela et al. | |
| 2003/0012358 A1 | 1/2003 | Kurtz et al. | |
| 2010/0268537 A1* | 10/2010 | Al-Telmissani | G10L 17/04 704/E17.007 |
| 2011/0051905 A1 | 3/2011 | Maria Poels | |
| 2011/0123008 A1 | 5/2011 | Sarnowski | |
| 2014/0244257 A1* | 8/2014 | Colibro | G10L 17/12 704/246 |
| 2015/0120027 A1 | 4/2015 | Cote et al. | |
| 2015/0221305 A1* | 8/2015 | Sharifi | G10L 15/02 704/235 |
| 2015/0269946 A1* | 9/2015 | Jones | H04M 3/42221 704/273 |
| 2016/0293185 A1 | 10/2016 | Cote et al. | |
| 2017/0220929 A1* | 8/2017 | Rozen | G06F 7/483 |
| 2017/0222960 A1 | 8/2017 | Agarwal et al. | |
| 2017/0302794 A1 | 10/2017 | Spievak et al. | |
| 2017/0359362 A1 | 12/2017 | Kashi et al. | |
| 2018/0068103 A1* | 3/2018 | Pitkänen | G06Q 20/40145 |
| 2018/0082691 A1* | 3/2018 | Khoury | G10L 17/04 |
| 2018/0197548 A1* | 7/2018 | Palakodety | G10L 17/06 |
| 2019/0037081 A1* | 1/2019 | Rao | H04M 7/0078 |
| 2020/0053118 A1* | 2/2020 | Leng | G06N 3/08 |

OTHER PUBLICATIONS

Sizov, A., Khoury, E., Kinnunen, T., Wu, Z., & Marcel, S. (2015). Joint speaker verification and antispoofing in the $ i $-vector space. IEEE Transactions on Information Forensics and Security, 10(4), 821-832. (Year: 2015).*

Yan, C., Long, Y., Ji, X., & Xu, W. (Nov. 2019). The catcher in the field: A fieldprint based spoofing detection for text-independent speaker verification. In Proceedings of the 2019 ACM SIGSAC Conference on Computer and Communications Security (pp. 1215-1229). (Year: 2019).*

Canadian Examination Report dated Oct. 16, 2019, issued in corresponding Canadian Application No. 3,032,807, 3 pages.

International Search Report and Written Opinion issued in International Application No. PCT/US2020/054825 dated Jan. 28, 2021.

International Search Report and Written Opinion Issued in International Application No. PCT/US2017/044849 dated Jan. 11, 2018.

Schulzrinne et al., "RTP Payload for DTMF Digits, Telephone Tones, and Telephony Signals" Columbia University, Dec. 2006, <https://tools.ielf.org/html/rfc4733.>.

Snyder et al., "X-Vectors: Robust DNN Embeddings for Speaker Recognition," Center for Language and Speech Processing & Human Language Technology Center of Excellence, The Johns Hopkins University, 2018.

International Search Report and Written Opinion for PCT Appl. Ser. No. PCT/US2021/020891 dated Jul. 16, 2021 (18 pages).

Int'l Report on Patentability for PCT PCT/US2021/020891 dated Sep. 15, 2022 (11 pages).

Examination Report No. 1 on AU App. 2021231850 dated Mar. 24, 2023 (4 pages).

First Examiner's Requisition for CA app. 3,171,475 dated Oct. 3, 2023 (4 pages).

Extended European Search Report on EPO App.21764771.8 dated Jan. 22, 2024 (8 pages).

Li Jiakang et al.: "Joint Decision of Anti-Spoofing and Automatic Speaker Verification by Multi-Task Learning With Contrastive Loss", IEEE Access, IEEE, USA, vol. 8, Jan. 6, 2020 (Jan. 6, 2020), pp. 7907-7915, XP011765568, DOI: 10.1109/ACCESS.2020.2964048 [retrieved on Jan. 14, 2020] * figure 4 *.

Shim Hye-Jin et al.: "Replay Spoofing Detection System for Automatic Speaker Verification Using Multi-Task Learning of Noise Classes", 2018 Conference on Technologies and Applications of Artificial Intelligence (TAAI), IEEE, Nov. 30, 2018 (Nov. 30, 2018), pp. 172-176, XP033478478, DOI: 10.1109/TAAI.2018.00046 [retrieved on Dec. 24, 2018] * figure 2; table II* * sections I, II.A, III and IV*.

* cited by examiner

SYSTEMS AND METHODS OF SPEAKER-INDEPENDENT EMBEDDING FOR IDENTIFICATION AND VERIFICATION FROM AUDIO

CROSS-REFERENCE TO RELATED APPLICATIONS

This application claims priority to U.S. Provisional Application No. 62/985,757, filed Mar. 5, 2020, which is incorporated by reference in its entirety.

This application generally relates to U.S. application Ser. No. 17/066,210, filed Oct. 8, 2020; U.S. application Ser. No. 17/079,082, filed Oct. 23, 2020; and U.S. application Ser. No. 17/155,851, filed Jan. 22, 2021, each of which is incorporated by reference in its entirety.

TECHNICAL FIELD

This application generally relates to systems and methods for training and deploying audio processing machine learning models.

BACKGROUND

There are various forms of communications channels and devices available today for audio communications, including Internet of Things (IoT) devices for communications via computing networks or telephone calls of various forms, such as landline telephone calls, cellular telephone calls, and Voice-over-IP (VoIP) calls, among others. In a telephony system, due to the introduction of virtual phone numbers, a telephone number, Automatic Number Identification (ANI), or Caller Identification (caller ID) is no longer tied uniquely to an individual subscriber or telephone line. Some of the VoIP services enable deliberate spoofing of such identifiers (e.g., telephone number, ANI, caller ID), where a caller can deliberately falsify the information transmitted to a receiver's display to disguise the caller's identity. Consequently, phone numbers and similar telephony identifier are no longer reliable for verifying the call's audio source.

As caller ID services have become less reliable, automatic speaker verification (ASV) systems are becoming a necessity for authenticating the source of telephone calls. However, ASV systems have strict net speech requirements and are susceptible to voice spoofing, such as voice modulation, synthesized voice (e.g., deepfakes), and replay attacks. ASVs are also affected by background noise often experienced in telephone calls. Therefore, what is needed is a means for evaluating other attributes of an audio signal that are not dependent upon a speaker's voice in order to verify a legitimate source of an audio signal.

SUMMARY

Disclosed herein are systems and methods capable of addressing the above described shortcomings and may also provide any number of additional or alternative benefits and advantages. Embodiments described herein provide for audio processing operations that evaluate characteristics of audio signals that are independent of the speaker, or complementary to evaluating speaker-dependent characteristics. Computer-executed software executes one or more machine learning models, which may include Gaussian Mixture Models (GMMs) and/or a neural network architecture having discriminatory neural networks, such as convolutional neural networks (CNNs), deep neural networks (DNNs), and recurrent neural networks (RNNs), referred to herein as "task-specific machine learning models" or "task specific models," each tasked with and configured for modeling and/or classifying a corresponding speaker-independent characteristic.

The task-specific machine learning models are trained for each of the speaker-independent characteristics of an input audio signal using input audio data and metadata associated with the audio data or audio source. The discriminatory models are trained and developed to differentiate between classifications for the characteristics of the audio. One or more modeling layers (or modeling operations) generate or extract feature vectors, sometimes called "embeddings" or combined to form embeddings, based upon the input audio data. Certain post-modeling operations (or post-modeling layers) ingest the embeddings from the task-specific models and train the task-specific models. The post-modeling layers (or post-modeling operations) concatenate the speaker-independent embeddings to form deep-phoneprint (DP) vectors for the input audio signal. The DP vector is a low dimensional representation of the each of the various speaker-independent characteristics of the audio signal aspects of the audio. Non-limiting examples of additional or alternative post-modeling operations or post-modeling layers of task-specific models may include classification operations/layers, fully-connected layers, loss functions/layers, and regression operations/layers (e.g., Probabilistic Linear Discriminant Analysis (PLDA)).

The DP vector may be used for various downstream operations or tasks, such as creating an audio-based exclusion/permissive list, enforcing an audio-based exclusion/permissive list, authenticating enrolled legitimate audio sources, determining a device type, determining a microphone type, determining a geographical location of the source of the audio, determining a codec, determining a carrier, determining a network type involved in transmission of the audio, detecting a spoofing service that spoofed a device identifier, recognizing a spoofing service, and recognizing audio events occurring in the audio signal.

The DP vector can be employed in audio-based authentication operations, either alone or complementary to voice biometric features. Additionally or alternatively, The DP vector can be used for audio quality measurement purpose and can be combined with a voice biometric system for various downstream operations or tasks.

In an embodiment, a computer-implemented method comprises applying, by a computer, a plurality of task-specific machine learning models on an inbound audio signal having one or more speaker-independent characteristics to extract a plurality of speaker-independent embeddings for the inbound audio signal; extracting, by the computer, a deep phoneprint (DP) vector for the inbound audio signal based upon the plurality of speaker-independent embeddings extracted for the inbound audio signal; and applying, by the computer, one or more post-modeling operations on the plurality of speaker-independent embeddings extracted for the inbound audio signal to generate one or more post-modeling outputs for the inbound audio signal.

In another embodiment, a database comprises non-transitory memory configured to store a plurality of training audio signals having one or more speaker-independent characteristics. A server comprises a processor configured to apply the plurality of task-specific machine learning models on an inbound audio signal having one or more speaker-independent characteristics to extract a plurality of speaker-independent embeddings for the inbound audio signal; extract a deep phoneprint (DP) vector for the inbound audio signal based upon the plurality of speaker-independent embeddings extracted for the inbound audio signal; and apply one or more post-modeling operations on the plurality of speaker-independent embeddings extracted for the inbound audio signal to generate one or more post-modeling outputs for the inbound audio signal.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
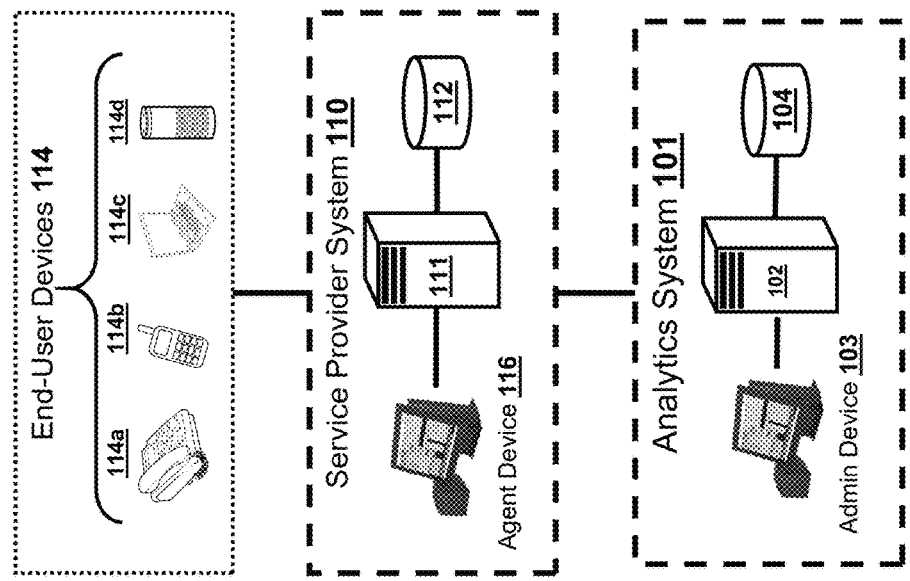
FIG. 1 shows components of a system for receiving and analyzing audio signals from end-users, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for processing audio signals involving speaker voice samples and employing the results in any number of downstream operations or tasks. A computing device (e.g., server) of a system executes software programming that performs various machine-learning algorithms, including various types of variants of Gaussian Mixture Model (GMM) or neural networks, such as convolutional neural networks (CNNs), deep neural networks (DNNs), recurrent neural networks (RNNs), and the like. The software programming trains models for recognizing and evaluating speaker-independent characteristics of audio signals received from audio sources (e.g., caller-users, speaker-users, originating locations, originating systems). The various characteristics of the audio signals are independent of the particular speaker of the audio signals, as opposed to speaker-dependent characteristics that are related to the particular speaker's voice.

Non-limiting examples of the speaker-independent characteristics include: device type from which an audio is originated and recorded (e.g., landline phone, cellular phone, computing device, Internet-of-Things (IoT)/edge devices); microphone type that is used to capture audio (e.g., speakerphone, headset, wired or wireless headset, IoT devices); carrier through which an audio is transmitted (e.g., AT&T, Sprint, T-MOBILE, Google Voice); a codec applied for compression and decompression of the audio for transmission or storage; a geographical location associated with the audio source (e.g., continents, countries, states/provinces, counties/cities); determining whether an identifier associated with the audio source is spoofed; determining a spoofing service that may be used to change the source identifier associated with the audio (e.g., Zang, Tropo, Twilio); a type of the network through which an audio is transmitted; audio events occurring in the input audio signal (e.g., cellular network, landline telephony network, VOIP device); audio events occurring during the input audio signal (e.g., background noise, traffic sound, TV noise, music, crying baby, train or factory whistles, laughing); and a communications channel through which the audio was received, among others.

The device type may be more granular to reflect, for example, a manufacturer (e.g., Samsung, Apple) or model of the device (e.g., Galaxy S10, iPhone X). The codecs classifications may further indicate, for example, a single codec or multiple cascaded codecs. The codec classifications may further indicate or be used to determine other information. For example, as audio signal, such as a phone call, may originate from different source device types (e.g., landline, cell, VoIP device), different audio codecs are applied to the audio of the call (e.g., SILK codec on Skype, WhatsApp, G722 in PSTN, GSM codec).

The server (or other computing device) of the system executes one or more machine learning models and/or neural network architectures comprising machine learning modeling layers or neural network layers for performing various operations, including layers of discriminatory neural network models (e.g., DNNs, CNNs, RNNs). Each particular machine learning model is trained for corresponding the aspects of the audio signals using audio data and/or metadata related to the particular aspect. The neural networks learn to differentiate between classification labels of the various aspects of the audio signals. One or more fully connected layers of the neural network architecture extract feature vectors or embeddings for the audio signals generated from each of the neural networks and concatenate the respective feature vectors to form a deep-phoneprint (DP) vector. The DP vector is a low dimensional representation of the different aspects of the audio signal.

The DP vector is employed in various downstream operations. Non-limiting examples may include: creating and enforcing an audio-based exclusion list; authenticating enrolled or legitimate audio sources; determining a device type, a microphone type, a geographical location of an audio source, a codec, a carrier, and/or a network type involved in transmission of the audio; detecting a spoofed identifier associated with an audio signal, such as a spoofed caller identifier (caller ID), spoofed automated number identifier (ANI), or spoofed phone number; or recognizing a spoofing service, among others. Additionally or alternatively, the DP vector is complementary to voice biometric features. For example, the DP vector can be employed along with a complementary voiceprint (e.g., voice-based speaker vector or embedding) to perform audio quality measurements and audio improvements or to perform authentication operations by a voice biometric system.

For ease of description and understanding, the embodiments described herein involve a neural network architecture that comprises any number of task-specific machine learning models configured to model and classify particular aspects of audio signals, where each task corresponds to modeling and classifying a particular characteristic of an audio signal. For example, the neural network architecture can comprise a device-type neural network and a carrier neural network, where the device-type neural network models and classifies the type of device that originated the input audio signal and the carrier neural network that models and classifies the particular communications carrier associated with the input audio signal. However, the neural network architecture need not comprise each task-specific machine learning model. The server may, for example, execute task-specific machine learning models individually as discrete neural network architectures or execute any number of neural network architecture comprising any combination of task-specific machine learning models. The server then models or clusters the resulting outputs of each task-specific machine learning model to generate the DP vectors.

The system is described herein as executing a neural network architecture having any number of machine learning model layers or neural network layers, though any number of combinations or architectural structure of the machine learning architecture are possible. For example, a shared machine learning model might employ a shared GMM operation for jointly modeling an input audio signal and extracting one or more feature vectors, then for each task execute separate fully-connected layers (of separate fully-connected neural networks) that perform various pooling and statistical operations for the particular task. Generally, the architecture includes modeling layers, pre-modeling layers, and post-modeling layers. The modeling layers include layers for performing audio processing operations, such as extracting feature vectors or embeddings from various types of features extracted from an input audio signal or metadata. The pre-modeling layers perform pre-processing operations for ingesting and preparing the input audio signal and metadata for the modeling layers, such as extracting features from the audio signal or metadata, transform operations, or the like. The post-modeling layers perform operations that use the outputs of the modeling layers, such as training operations, loss functions, classification operations, and regression functions. The boundaries and functions of the types of layers may vary in different implementations.

System Architecture

FIG. 1 shows components of a system 100 for receiving and analyzing audio signals from end-users. The system 100 comprises an analytics system 101, service provider systems 110 of various types of enterprises (e.g., companies, government entities, universities), and end-user devices 114. The analytics system 101 includes analytics server 102, analytics database 104, and admin device 103. The service provider system 110 includes provider servers 111, provider databases 112, and agent devices 116. Embodiments may comprise additional or alternative components or omit certain components from those of FIG. 1, and still fall within the scope of this disclosure. It may be common, for example, to include multiple service providers systems 110 or for the analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 may be integrated into the analytics server 102.

Embodiments described with respect to FIG. 1 are merely examples employing the speaker-independent embeddings and deep-phoneprinting and are not necessarily limiting on other potential embodiments. The description of FIG. 1 mentions circumstances in which end-users place calls to the service provider system 110 through various communications channels to contact and/or interact with services offered by the service provider. But the operations and features of the various deep-phoneprinting implementations described herein may be applicable to many circumstances for evaluating speaker-independent aspects of an audio signal. For instance, the deep-phoneprinting audio processing operations described herein may be implemented within various types of devices and need not be implemented within a larger infrastructure. As an example, an IoT device 114*d* may implement the various processes described herein when capturing an input audio signal from an end-user or when receiving an input audio signal from another end-user via a TCP/IP network. As another example, end-user devices 114 may execute locally installed software implementing the deep-phoneprinting processes described herein allowing, for example, deep-phoneprinting processes in user-to-user interactions. A smartphone 114*b* may execute the deep-phoneprinting software when receiving an inbound call from another end-user to perform certain downstream operations, such as verifying the identity of the other end-user or indicating whether the other end-user is using a spoofing service.

Various hardware and software components of one or more public or private networks may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., provider systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The end-user devices 114 may be any communications or computing device that the caller operates to access the services of the service provider system 110 through the various communications channels. For instance, the end-user may place the call to the service provider system 110 through a telephony network or through a software application executed by the end-user device 114. Non-limiting examples of end-user devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The end-user device 114 is not limited to the telecommunications-oriented devices or channels. For instance, in some cases, the mobile phones 114b may communicate via a computing network channel (e.g., the Internet). The end-user device 114 may also include an electronic device comprising a processor and/or software, such as a calling computing device 114c or edge device 114d implementing, for example, voice-over-IP (VoIP) telecommunications, data streaming via a TCP/IP network, or other computing network channel. The edge device 114d may include any IoT device or other electronic device for computing network communications. The edge device 114d could be any smart device capable of executing software applications and/or performing voice interface operations. Non-limiting examples of the edge device 114d may include voice assistant devices, automobiles, smart appliances, and the like.

The service provider system 110 comprises various hardware and software components that capture and store various types of audio signal data or metadata related to the caller's contact with the service provider system 110. This audio data may include, for example, audio recordings of the call and the metadata related to the software and various protocols employed for the particular communication channel. The speaker-independent features of the audio signal, such as the audio quality or sampling rate, can represent (and be used to evaluate) the various speaker-independent aspects, such as a codec, a type of end-user device 114, or a carrier, among others.

The analytics system 101 and the provider system 110 represent network infrastructures 101, 110 comprising physically and logically related software and electronic devices managed or operated by various enterprise organizations. The devices of each network system infrastructure 101, 110 are configured to provide the intended services of the particular enterprise organization.

The analytics server 102 of the analytics system 101 may be any computing device comprising one or more processors and software, and capable of performing the various processes and tasks described herein. The analytics server 102 may host or be in communication with the analytics database 104, and receives and processes audio signal data (e.g., audio recordings, metadata) received from the one or more provider systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. In some embodiments, functions of the analytics server 102 may be partly or entirely performed by the computing devices of the provider system 110 (e.g., the provider server 111).

The analytics server 102 executes audio-processing software that includes one or more neural network architectures having neural network layers for deep-phoneprinting operations (e.g., extracting speaker-independent embeddings, extracting DP vectors) and any number of downstream audio processing operations. For ease of description, the analytics server 102 is described as executing a single neural network architecture for implementing deep-phoneprinting, including neural network layers for extracting speaker-independent embeddings and deep-phoneprint vectors (DP vectors), though multiple neural network architectures could be employed in some embodiments. The analytics server 102 and the neural network architecture operate logically in several operational phases, including a training phase, an enrollment phase, and a deployment phase (sometimes referred to as a "test" phase or "inference" phase), though some embodiments need not perform the enrollment phase. The inputted audio signals processed by the analytics server 102 and the neural network architecture include training audio signals, enrollment audio signals, and inbound audio signals (processed during the deployment phase). The analytics server 102 applies the neural network architecture to each type of inputted audio signal during the corresponding operational phase.

The analytics server 102 or other computing device of the system 100 (e.g., provider server 111) can perform various pre-processing operations and/or data augmentation operations on the input audio signals (e.g., training audio signals, enrollment audio signals, inbound audio signals). The analytics server 102 may perform the pre-processing operations and data augmentation operations when executing certain neural network layers, though the analytics server 102 may also perform certain pre-processing or data augmentation operations as a separate operation from the neural network architecture (e.g., prior to feeding the input audio signal into the neural network architecture).

Optionally, the analytics server 102 performs any number of pre-processing operations before feeding the audio data into the neural network. The analytics server 102 may perform the various pre-processing operations in one or more of the operational phases (e.g., training phase, enrollment phase, deployment phase), though the particular pre-processing operations performed may vary across the operational phases. The analytics server 102 may perform the various pre-processing operations separately from the neural network architecture or when executing an in-network layer of the neural network architecture. Non-limiting examples of the pre-processing operations performed on the input audio signals include: executing voice activity detection (VAD) software or VAD neural network layers; extracting the features (e.g., one or more spectro-temporal features) from portions (e.g., frames, segments) or from substantially all of the particular input audio signal; and transforming the extracted features from a time-domain representation into a frequency-domain representation by performing Short-time Fourier Transforms (SFT) and/or Fast Fourier Transforms (FFT) operations, among other pre-processing operations. The features extracted from the input audio signal may include, for example, Mel frequency cepstrum coefficients (MFCCs), Mel Filter banks, Linear filter banks, bottleneck features, and metadata fields of the communication protocol, among other types of data. The pre-processing operations may also include parsing the audio signals into frames or sub-frames, and performing various normalization or scaling operations.

As an example, the neural network architecture may comprise neural network layers for VAD operations that parse a set of speech portions and a set of non-speech portions from each particular input audio signal. The analytics server 102 may train the classifier of the VAD separately (as a distinct neural network architecture) or along with the neural network architecture (as a part of the same neural network architecture). When the VAD is applied to the features extracted from the input audio signal, the VAD may output binary results (e.g., speech detection, no speech detection) or contentious values (e.g., probabilities of speech occurring) for each window of the input audio signal, thereby indicating whether a speech portion occurs at a given window. The server may store the set of one or more speech portions, set of one or more non-speech portions, and the input audio signal into a memory storage location, including short-term RAM, hard disk, or one or more databases 104, 112.

As mentioned, the analytics server 102 or other computing device of the system 100 (e.g., provider server 111) may perform various augmentation operations on the input audio signal (e.g., training audio signal, enrollment audio signal, inbound audio signal). Non-limiting examples of augmentation operations include frequency augmentation, audio clipping, and duration augmentation, among others The augmentation operations generate various types of distortion or degradation for the input audio signal, such that the resulting audio signals are ingested by, for example, the convolutional operations of modeling layers that generate the feature vectors or speaker-independent embeddings. The analytics server 102 may perform the various augmentation operations as separate operations from the neural network architecture or as in-network augmentation layers. The analytics server 102 may perform the various augmentation operations in one or more of the operational phases, though the particular augmentation operations performed may vary across the operational phases.

As detailed herein, the neural network architecture comprises any number of task-specific models configured to model and classify particular speaker-independent aspects of the input audio signals, where each task corresponds to modeling and classifying a particular speaker-independent characteristic of the input audio signal. For example, the neural network architecture comprises a device-type neural network that models and classifies the type of device that originated an input audio signal and a carrier neural network that models and classifies the particular communications carrier associated with the input audio signal. As mentioned, the neural network architecture need not comprise each task-specific model. For example, the server may execute task-specific models individually as discrete neural network architectures or execute any number of neural network architecture comprising any combination of task-specific models.

The neural network architecture includes the task-specific models configured to extract corresponding speaker-independent embeddings and a DP vector based upon the speaker-independent embeddings. The server applies the task-specific models on the speech portions (or speech-only abridged audio signal) and then again on the non-speech portions (or speechless-only abridged audio signal). The analytics server 102 applies certain types of task-specific models (e.g., audio event neural network) to substantially all of input audio signal (or, at least, that has not been parsed by the VAD). For example, the task-specific models of the neural network architecture include a device-type neural network and an audio event neural network. In this example, the analytics server 102 applies the device-type neural network on the speech portions and then again on the non-speech portions to extract speaker-independent embeddings for the speech portions and the non-speech portions. The analytics server 102 then applies the device-type neural network on the input audio signal to extract an entire audio signal embedding.

During the training phase, the analytics server 102 receives training audio signals having varied speaker-independent characteristics (e.g., codecs, carriers, device-types, microphone-types) from one or more corpora of training audio signals stored in an analytics database 104 or other storage medium. The training audio signals may further include clean audio signals and simulated audio signal, each of which the analytics server 102 uses to train the various layers of the neural network architecture.

The analytics server 102 may retrieve the simulated audio signals from the more analytics databases 104 and/or generate the simulated audio signals by performing various data augmentation operations. In some cases, the data augmentation operations may generate a simulated audio signal for a given input audio signal (e.g., training signal, enrollment signal), in which the simulated audio signal contains manipulated features of the input audio signal mimicking the effects a particular type of signal degradation or distortion on the input audio signal. The analytics server 102 stores the training audio signals into the non-transitory medium of the analytics server 102 and/or the analytics database 104 for future reference or operations of the neural network architecture.

The training audio signals are associated with training labels, which are separate machine-readable data records or metadata coding of the training audio signal data files. The labels can be generated by users to indicate expected data (e.g., expected classifications, expected features, expected feature vectors), or the labels can be automatically generated according to computer-executed processes used to generate the particular training audio signal. For example, during a noise augmentation operation, the analytics server 102 generates a simulated audio signal by algorithmically combining an input audio signal and a type of noise degradation. The analytics server 102 generates or updates a corresponding label for the simulated audio signal indicating the expected features, the expected feature vectors, or other expected types of data for the simulated audio signal.

In some embodiments, the analytics server 102 performs an enrollment phase to develop enrollee speaker-independent embeddings and enrollee DP vectors. The analytics server 102 may perform or all of the pre-processing and/or data augmentation operations on enrollee audio signals for an enrolled audio source.

During the training phase and, during the enrollment phase in some embodiments, one or more fully-connected layers, classification layers, and/or output layers of each task-specific model generate predicted outputs (e.g., predicted classifications, predicted speaker-independent feature vectors, predicted speaker-independent embeddings, predicted DP vectors, predicted similarity scores) for the training audio signals (or enrollment audio signals). Loss layers perform various types of loss functions to evaluate the distances (e.g., differences, similarities) between predicted outputs (e.g., predicated classifications) to determine a level error between the predicted outputs and corresponding expected outputs indicated by training labels associated with the training audio signals (or enrollment audio signals). The loss layers, or other functions executed by the analytics server 102, tune or adjust the hyper-parameters of the neural network architecture until the distance between the predicted outputs and the expected outputs satisfies a training threshold.

During the enrollment operational phase, an enrolled audio source (e.g., end-user device 114, enrolled organization, enrollee-user), such as an enrolled user of the service provider system 110, provides (to the analytics system 101) a number of enrollment audio signals containing examples of speaker-independent characteristics. In some embodiments, the enrolled audio source further includes examples of an enrolled user's speech. The enrolled user may provide enrollee audio signals via any number of channels and/or using any number of channels. The analytics server 102 or provider server 111 captures enrollment audio signals actively or passively. In active enrollment, the enrollee responds to audio prompts or GUI prompts to supply enrollee audio signals to the provider server 111 or analytics server 102. As an example, the enrollee could respond to various interactive voice response (IVR) prompts of IVR software executed by a provider server 111 via a telephone channel. As another example, the enrollee could respond to various prompts generated by the provider server 111 and exchanged with a software application of the edge device 114*d* via a corresponding data communications channel. As another example, the enrollee could upload media files (e.g., WAV, MP3, MP4, MPEG) containing audio data to the provider server 111 or analytics server 102 via a computing network channel (e.g. Internet, TCP/IP). In passive enrollment, the provider server 111 or analytics server 102 collects the enrollment audio signals through one or more communications channels, without the enrollee's awareness and/or in an ongoing manner over time. For embodiments where the provider server 111 receives or otherwise gathers enrollment audio signals, the provider server 111 forwards (or otherwise transmits) the bona fide enrollment audio signals to the analytics server 102 via one or more networks.

The analytics server 102 feeds each enrollment audio signal into the VAD to parse the particular enrollment audio signal into speech portions (or speech-only abridged audio signal) and non-speech portions (or speechless-only abridged audio signal). For each enrollment audio signal, the analytics server 102 applies the trained neural network architecture, including the trained task-specific models, on the set of speech portions and again on the set of non-speech portions. The task-specific models generate enrollment speaker-independent feature vectors for the enrollment audio signal based upon features extracted from the enrollment audio signal. The analytics server 102 algorithmically combines the enrollment feature vectors, generated from across the enrollment audio signals, to extract a speech speaker-independent enrollment embedding (for the speech portions) and a non-speech speaker-independent enrollment embedding (for non-speech portions). The analytics server 102 then applies a full-audio task-specific model to generate full-audio enrollment feature vectors for each of the enrollment audio signals. The analytics server 102 then algorithmically combines the full-audio enrollment feature vectors to extract a full-audio speaker-independent enrollment embedding. The analytics server 102 then extracts an enrollment DP vector for the enrollee audio source by algorithmically combing each of the speaker-independent embeddings. The speaker-independent embeddings and/or the DP vectors are sometimes referred to as "deep phoneprints."

The analytics server 102 stores the extracted enrollment speaker-independent embeddings and the extracted DP vectors for each of the various enrolled audio sources. In some embodiments, the analytics server 102 may similarly store extracted enrollment speaker-dependent embeddings (sometimes called "voiceprints" or "enrollment voiceprints"). The enrolled speaker-independent embeddings are stored into the analytics database 104 or the provider database 112. Examples of neural networks for speaker verification have been described in U.S. patent application Ser. Nos. 17/066,210 and 17/079,082, which are incorporated by reference herein.

Optionally, certain end-user devices 114 (e.g., computing devices 114*c*, edge devices 114*d*) execute software programming associated with the analytics system 101. The software program generates the enrollment feature vectors by locally capturing enrollment audio signals and/or locally applies (on-device) the trained neural network architecture to each of the enrollment audio signals. The software program then transmits the enrollment feature vectors to the provider server 111 or the analytics server 102.

Following the training phase and/or the enrollment phase, the analytics server 102 stores the trained neural network architecture or the developed neural network architecture into the analytics database 104 or the provider database 112. The analytics server 102 places the neural network architecture into the training phase or the enrollment phase, which may include enabling or disabling certain layers of the neural network architecture. In some implementations, a device of the system 100 (e.g., provider server 111, agent device 116, admin device 103, end-user device 114) instructs the analytics server 102 to enter into the enrollment phase for developing the neural network architecture by extracting the various types of embeddings for the enrollment audio source. The analytics server 102 then stores the extracted enrollment embeddings and the trained neural network architecture into one or more databases 104, 112 for later reference during the deployment phase.

During the deployment phase, the analytics server 102 receives the inbound audio signal from an inbound audio source, as originated from the end-user device 114 received through a particular communications channel. The analytics server 102 applies the trained neural network architecture on the inbound audio signal to generate a set of speech portions and a set of non-speech portions, extract the features from the inbound audio signal, and extract inbound speaker-independent embeddings and an inbound DP vector for the inbound audio source. The analytics server 102 may employ the extracted embeddings and/or the DP vectors in various downstream operations. For example, the analytics server 102 may determine a similarity score based upon the distance, differences/similarities, between the enrollment DP vector and the inbound DP vector, where the similarity score indicates the likelihood that the enrollment DP vector originated from the same audio source as the inbound DP vector. As explained herein deep-phoneprinting outputs produced by the machine learning models, such as speaker-independent embeddings and DP vector, may be employed in various downstream operations.

The analytics database 104 and/or the provider database 112 may be hosted on a computing device (e.g., server, desktop computer) comprising hardware and software components capable of performing the various processes and tasks described herein, such as non-transitory machine-readable storage media and database management software (DBMS). The analytics database 104 and/or the provider database 112 contains any number of corpora of training audio signals that are accessible to the analytics server 102 via one or more networks. In some embodiments, the analytics server 102 employs supervised training to train the neural network, where the analytics database 104 and/or the provider database 112 contains labels associated with the training audio signals or enrollment audio signals. The labels indicate, for example, the expected data for the training signals or enrollment audio signals. The analytics server 102 may also query an external database (not shown) to access a third-party corpus of training audio signals. An administrator may configure the analytics server 102 to select the training audio signals having varied types of speaker-independent characteristics.

The provider server 111 of the provider system 110 executes software processes for interacting with the end-users through the various channels. The processes may include, for example, routing calls to the appropriate agent devices 116 based on an inbound caller's comments, instructions, IVR inputs, or other inputs submitted during the inbound call. The provider server 111 can capture, query, or generate various types of information about the inbound audio signal, the caller, and/or the end-user device 114 and forward the information to the agent device 116. A graphical user interface (GUI) of the agent device 116 displays the information to an agent of the service provider. The provider server 111 also transmits the information about the inbound audio signal to the analytics system 101 to preform various analytics processes on the inbound audio signal and any other audio data. The provider server 111 may transmit the information and the audio data based upon preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The admin device 103 of the analytics system 101 is a computing device allowing personnel of the analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the analytics system 101 or provider system 110 and to issue queries and instructions to such components.

The agent device 116 of the provider system 110 may allow agents or other users of the provider system 110 to configure operations of devices of the provider system 110. For calls made to the provider system 110, the agent device 116 receives and displays some or all of the information associated with inbound audio signals routed from the provider server 111.

Example Operations

Operational Phases

Figure 2:
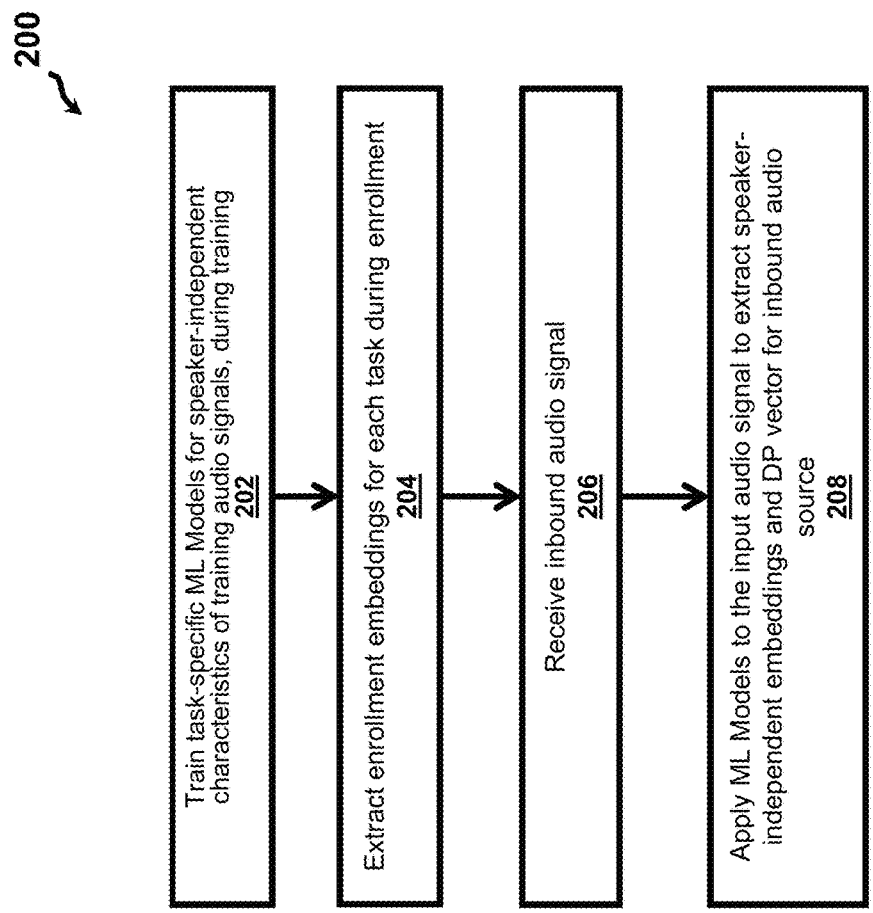
FIG. 2 shows steps of a method for implementing task-specific models for processing speaker-independent aspects of audio signals, according to an embodiment.

FIG. 2 shows steps of a method 200 for implementing task-specific models for processing speaker-independent aspects of audio signals. Embodiments may include additional, fewer, or different operations than those described in the method 200. The method 200 is performed by a server executing machine-readable software code of a neural network architecture comprising any number of neural network layers and neural networks, though the various operations may be performed by one or more computing devices and/or processors. Although the server is described as generating and evaluating enrollee embeddings, the server need not generate and evaluate the enrollee embeddings in all embodiments.

In step 202, the server places the neural network architecture and the task-specific models into the training phase. The server applies the neural network architecture to any number of training audio signals to train the task-specific models. The task-specific models include the modeling layers. The modeling layers may include "embedding extraction layers" or "hidden layers" that, for example, generate feature vectors for the input audio signals.

During the training phase, the server applies the modeling layers on the training audio signals to generate training feature vectors. Various post-modeling layers, such as fully-connected layers and classification layers (sometimes called "classifier layers" or a "classifier") of each task-specific models determine a task-related classification based upon the training feature vectors. For example, the task-specific models may include a device-type neural network or a carrier neural network. The classifier layers of the device-type neural network outputs a predicted brand classification of the device of the audio source, and the classifier layers of the carrier neural network outputs a predicted carrier classification associated with the audio source.

The task-specific models generate predicted outputs (e.g., predicted training feature vector, predicted classification) for the particular training audio signals. The post-embedding modeling layers (e.g., classification layers, fully-connected layers, loss layer) of the neural network architecture perform a loss function according to the predicted outputs for the training signals and labels associated with the training audio signals. The server executes the loss function to determine a level of error of the training feature vectors produced by the modeling layers of the particular task-specific model. The classifier layer (or other layer) adjusts hyper-parameters of the task-specific model and/or other layers of the neural network architecture until the training feature vectors converge with expected feature vectors indicated by the labels associated with the training audio signals. When the training phase is completed, the server stores the hyper-parameters into a memory of the server or other memory location. The server may also disable one or more layers of the neural network architecture during later operational phases in order to keep the hyper-parameters fixed.

Certain types of task-specific models are trained on the entire training audio signal, such as an audio event neural network. The server applies these particular task-specific models against the entire training audio signal and outputs a predicted classification (e.g., audio event classification). Likewise, certain task-specific models are trained on speech portions and separately on the non-speech portions of the training signal. For instance, one or more layers of the neural network architecture define a VAD layer, which the server applies against the training audio signal to parse the training audio signal into a set of speech portions and a set of non-speech portions. The server then applies each particular task-specific model on the speech portions to train a speech task-specific model and again on the non-speech portions to train a non-speech task-specific model.

The server can train each task-specific model individually and/or sequentially, sometimes called a "single task" configuration, where each task-specific model comprises distinct modeling layers for extracting separate embeddings. Each task-specific model outputs distinct predicted outputs (e.g., predicted feature vector, predicted classification). The loss function evaluates the level of error for each task-specific model based upon the relative distances (e.g., similarities or differences) between the predicted outputs and expected outputs indicated by the labels. The loss function then adjusts the hyper-parameters or other aspects of the neural network architecture to minimize the level of error. When the level error satisfies a training threshold, the server fixes (e.g., saves, does not disturb) the hyper-parameters or other aspects of the neural network architecture.

The server can train the task-specific models jointly, sometimes called a "multi-task" configuration, where multiple task-specific models share the same hidden modeling layers and the loss layer, but have certain distinct post-modeling layers (e.g., fully-connect layers, classification layers). The server feeds the training audio signal into the neural network architecture and applies each of the task-specific models. The neural network architecture comprises shared hidden layers for generating joint feature vectors for the input audio signals. Each of the task-specific models includes separate post-modeling layers that ingest the joint feature vector and, for example, generate a task-specific predicted output (e.g., predicted feature vector, predicted classification). In some cases, a shared loss layer is applied to each of the predicted outputs and the labels associated with the training audio signals to adjust the hyper-parameters and minimize the level of error. Additional post-modeling layers may algorithmically combine or concatenate the predicted feature vectors of a particular training audio signal to output a predicted DP vector, among other potential predicted outputs (e.g., predicted classifications). As before, the server executes the shared loss function that evaluates the level of error between the predicted joint output and an expected joint output, according to one or more labels associated with the training audio signals and adjusts one or more hyper-parameters to minimize the level of error. When the level error satisfies a training threshold, the server fixes (e.g., saves, does not disturb) the hyper-parameters or other aspects of the neural network architecture.

In step 204, the server places the neural network architecture and the task-specific models into the enrollment phase to extract enrolled embeddings for an enrolled audio source. In some implementations, the server may enable and/or disable certain layers of the neural network architecture during the enrollment phase. For instance, the server typically enables and applies each of the layers during the enrollment phase, though the server disables the classification layer. The enrolled embeddings include speaker-independent embeddings, though in some embodiments speaker-modeling neural networks may extract one or more speaker-dependent embeddings for the enrolled audio source.

During the enrollment phase, the server receives the enrollment audio signals for the enrolled audio source and applies the task-specific models to extract the speaker-independent embeddings. The server applies the task-specific models to the enrollment audio signals, which generates enrollment feature vectors for each of the enrollment audio signals as described for the training phase (e.g., single task configuration, multi-task configuration). For each of the task-specific models, the server statistically or algorithmically combines the each of enrollment feature vectors to extract task-specific enrollment embeddings.

Certain task-specific models are applied separately on speech portions and again on the non-speech portions of the enrollment audio signals. The server applies the VAD to each particular enrollment audio signal to parse the enrollment audio signal into a set of speech portions and a set of non-speech portions. For these task-specific models, the neural network architecture extracts two speaker-independent embeddings: a task-specific embedding for the speech portions and a task-specific embedding for the non-speech portions. Similarly, certain task-specific models are applied on the entire enrollment audio signal (e.g., audio event neural network) to generate the enrollment feature vectors and extract the corresponding task-specific enrollment embedding.

The neural network architecture extracts an enrollment DP vector for the audio source. One or more post-modeling or output layers of the neural network architecture concatenate or algorithmically combine the various speaker-independent embeddings. The server then stores the enrollment DP vector into a memory.

In step 206, the server places the neural network architecture into the deployment phase (sometimes called "inference" or "testing" phase) when the neural network architecture generates inbound embeddings and an inbound DP vector for an inbound audio source. The server may enable and/or disable certain layers of the neural network architecture and task-specific models during the deployment phase. For instance, the server typically enables and applies each of the layers during the deployment phase, though the server disables the classification layer. In the current step 206, the server receives the inbound audio signal for the inbound speaker and feeds the inbound audio signal into the neural network architecture.

In step 208, during the deployment phase, the server applies the neural network architecture and task-specific models to the inbound audio signal to extract the inbound embeddings and the inbound DP vector. The neural network architecture then generates one or more similarity scores based upon the relative distance (e.g., similarities, differences) between the inbound DP vector and one or more enrolled DP vectors. The server applies the task-specific models to the inbound audio signal, which generates an inbound feature vector and extracts inbound speaker-independent embeddings and inbound DP vector for the inbound audio source as described for the training and enrollment phase (e.g., single task configuration, multi-task configuration).

As an example, the neural network architecture extracts the inbound DP vector and outputs a similarity score indicating the distance (e.g., similarities, differences) between the inbound DP vector and the enrollee DP vector. A larger distance may indicate a lower likelihood that the inbound audio signal originated from an enrollee audio source that originated the enrollee DP vector, due to fewer/lower similarities between the speaker-independent aspects of the inbound audio signal and the enrollee audio signals. In this example, the server determines that the inbound audio signal originated from the enrollee audio source when the similarity score satisfies a threshold value for audio source verification. The task-specific models and DP vectors, as described in the various embodiments herein, may be employed in any number of downstream operations.

Training and Enrollment for Single Task Configuration

Figure 3:
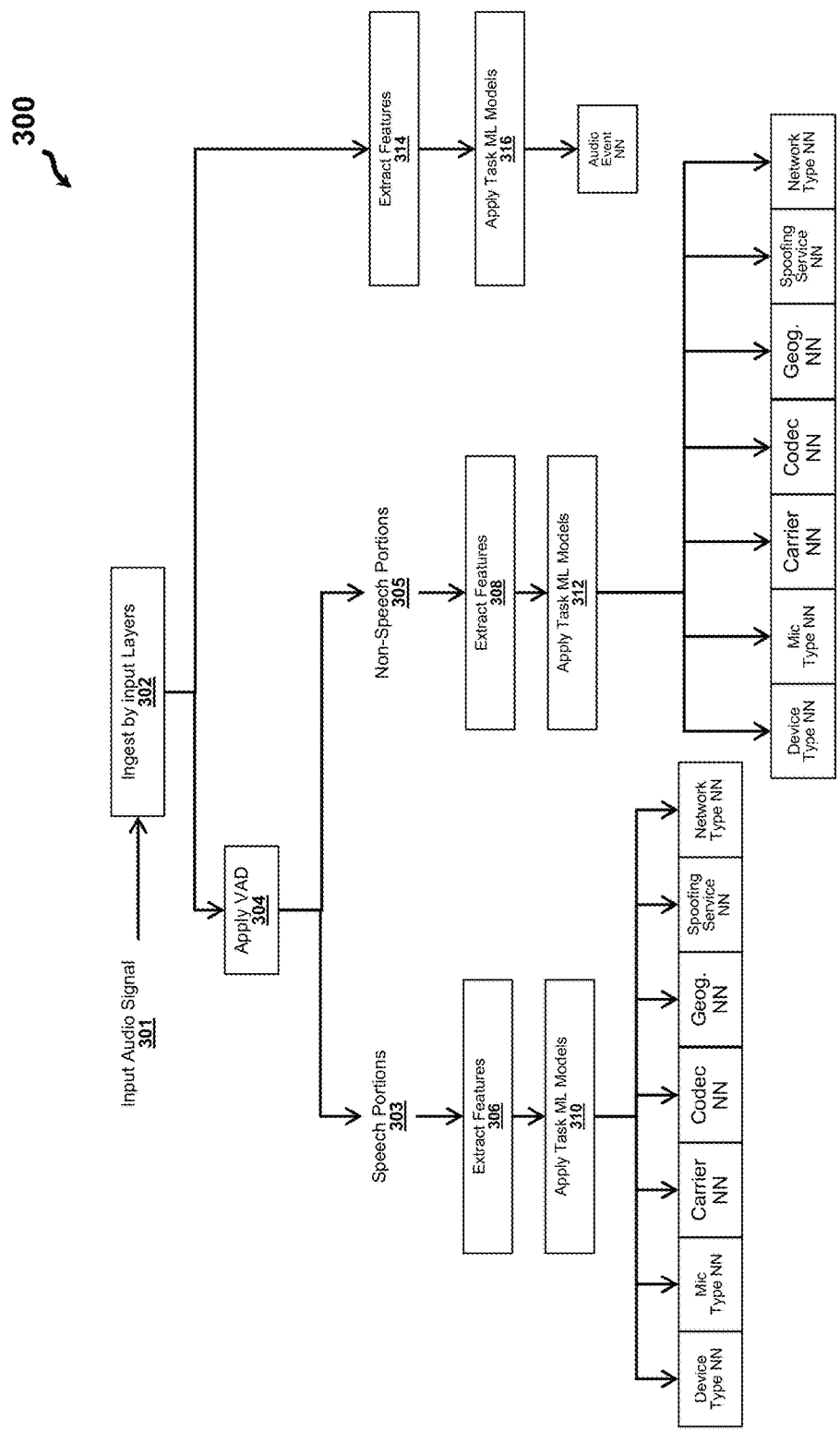
FIG. 3 shows execution steps of a method for training or enrollment operations of a neural network architecture for speaker-independent embeddings, according to an embodiment.

FIG. 3 shows execution steps of a method 300 for training or enrollment operations of a neural network architecture for speaker-independent embeddings. Embodiments may include additional, fewer, or different operations than those described in the method 300. The method 300 is performed by a server executing machine-readable software code of the neural network architecture, though the various operations may be performed by one or more computing devices and/or processors. Embodiments may include additional, fewer, or different operations than those described in the method 300.

In step 302, input layers of the neural network architecture ingest an input audio signal 301, which include training audio signals for the training phase or enrollment audio signals for the enrollment phase. The input layers perform various pre-processing operations on the input audio signal 301 (e.g., training audio signal, enrollment audio signal) prior to feeding the input audio signal 301 into various other layers of the neural network architecture. The pre-processing operations include, for example, applying a VAD operation, extracting low-level spectro-temporal features, and performing a data transform operation.

In some embodiments, the input layers perform various data augmentation operations during the training or enrollment phase. The data augmentation operations may generate or retrieve certain training audio signals, including clean audio signals and noise samples. The server may receive or request clean audio signals from one or more corpora databases. The clean audio signals may include audio signals originating from various types of audio sources having varied speaker-independent characteristics. The clean audio signals may be stored in non-transitory storage media accessible to the server or received via a network or other data source. The data augmentation operations may further receive simulated audio signals from one or more database or generate simulated audio signals based upon the clean audio signals or input audio signals 301 by applying various forms of data augmentation on the input audio signals 301 or clean audio signals. Examples of data augmentation techniques are described in U.S. patent application Ser. No. 17/155,851, which is incorporated by reference in its entirety.

In step 304, the server applies the VAD on the input audio signals 301. The neural network layers of the VAD detect occurrences of speech windows or non-speech windows of the input audio signal 301. The VAD parses the input audio signals 301 into speech portions 303 and non-speech portions 305. The VAD includes classification layers (e.g., classifier), which the server trains separately or jointly with the other layers of the neural network architecture. The VAD may directly output binary results (e.g., speech, non-speech) for portions of the input signal 301 or generate contentious values (e.g., probabilities) for each portion of the input audio signal 301 that the server evaluates against a speech detection threshold to output the binary results for the given portion. The VAD generates a set of speech portions 303 and a set of non-speech portions 305 parsed by the VAD from the input audio signal 301.

In step 306, the server extracts features from the set of speech portions 303, and in step 308, the server extracts the corresponding features from the set of non-speech portions 305. The server performs various pre-processing operations on the portions 303, 305 of the input audio signal 301 in order to, for example, extract the low-level features from the portions 303, 305, and transform such features from a time-domain representation into a frequency-domain representation by performing Short-time Fourier Transforms (SFT) and/or Fast Fourier Transforms (FFT).

The server and neural network architecture of the method 300 are configured to extract features related to the speaker-independent characteristics of the input audio signal 301, though in some embodiments, the server is further configured to extract features related to speaker-dependent characteristics that depend upon the speech.

In step 310, the server applies the task-specific models on the speech portions 303 to separately train the particular neural networks for the speech portions 303. The server receives the input audio signals 301 (e.g., training audio signals, enrollment audio signals) along with labels. The labels indicate certain expected speaker-independent characteristics of the input audio signals 301, such as an expected classification, expected features, expected feature vectors, expected metadata, and a type or degree of degradation present in the input audio signal 301, among other speaker-independent characteristics.

Each task-specific model includes one or more embedding extraction layers for modeling the particular characteristic of the input audio signals 301. The embedding extraction layers generate feature vectors or embeddings based upon the features extracted from the speech portions 303. During the training phase (and, in some cases, during the enrollment phase), classifier layers of the task-specific model determine a predicted classification for the speech portions 303 based upon the feature vectors. The server performs a loss function to determine a level of error based upon differences between a predicted speech output (e.g., predicted feature vectors, predicted classification) and an expected speech output (e.g., expected feature vectors, expected classification) according to the label associated with the particular input audio signal 301. The loss function or other operational layer of the neural network architecture adjusts hyper-parameters of the task-specific model until the level of error satisfies a threshold degree of error.

During the enrollment phase, the task-specific models output feature vectors and/or classifications. The neural network architecture statistically or algorithmically combines the feature vectors generated for the speech portions of the enrollment audio signals, to extract the enrolled speaker-independent embeddings for the speech portions.

In step 312, the server similarly applies the task-specific models on the non-speech portions 305 to the particular neural networks for the non-speech portions 303. The embedding extraction layers generate feature vectors or embeddings based upon the features extracted from the non-speech portions 305. During the training phase (and, in some cases, during the enrollment phase), the classifier layers of the task-specific model determine the predicted classification for the non-speech portions 305 based upon the feature vectors. The server performs the loss function to determine the level of error based upon the differences between the predicted non-speech output (e.g., predicted feature vectors, predicted classification) and an expected non-speech output (e.g., expected feature vectors, expected classification) according to the label associated with the particular input audio signal 301. The loss function or other operational layer of the neural network architecture adjusts hyper-parameters of the task-specific model until the level of error satisfies a threshold degree of error.

During the enrollment phase, the task-specific models output feature vectors and/or classifications. The neural network architecture statistically or algorithmically combines the feature vectors generated for the non-speech portions of the enrollment audio signals, to extract the enrolled speaker-independent embeddings for the non-speech portions.

In step 314, the server extracts features from an entire input audio signal 301. The server performs various pre-processing operations on the input audio signal 301 in order to, for example, extract features from the input audio signal 301, and transform one or more extracted features from a time-domain representation into a frequency-domain representation by performing SFT or FFT operations.

In step 316, the server applies the task-specific model (e.g., audio event neural network) on the entire input audio signal 301. The embedding extraction layers generate feature vectors based upon the features extracted from the input audio signal 301. During the training phase (and, in some cases, during the enrollment phase), the classifier layers of the task-specific model determine the predicted classification for the input audio signal 301 based upon the feature vectors. The server performs the loss function to determine the level of error based upon the differences between the predicted output (e.g., predicted feature vectors, predicted classification) and an expected output (e.g., expected feature vectors, expected classification) according to the label associated with the particular input audio signal 301. The loss function or other operational layer of the neural network architecture adjusts hyper-parameters of the task-specific model (e.g., the audio event neural network) until the level of error satisfies a threshold degree of error.

During the enrollment phase, the task-specific models of the current step 316 output feature vectors and/or classifications. The neural network architecture statistically or algorithmically combines the feature vectors generated for all of (or substantially all of) the enrollment audio signals, to extract the speaker-independent embedding based upon the feature vectors generated for the enrollment audio signals.

The neural network architecture further extracts a DP vector for an enrolled audio source. The neural network architecture extracts a pair of speaker-independent embeddings for each of the task-specific models that evaluate speech portions 303 separately from non-speech portions 305: a speech embedding and a non-speech embedding. In addition, the neural network architecture extracts a single speaker-independent embedding for each task-specific model that evaluates the full input audio signal 301. One or more post-modeling layers of the neural network architecture concatenates or algorithmically combines the speaker-independent embeddings to extract the enrolled DP embedding for the enrolled audio source.

Training and Enrollment for Multi Task Configuration

Figure 4:
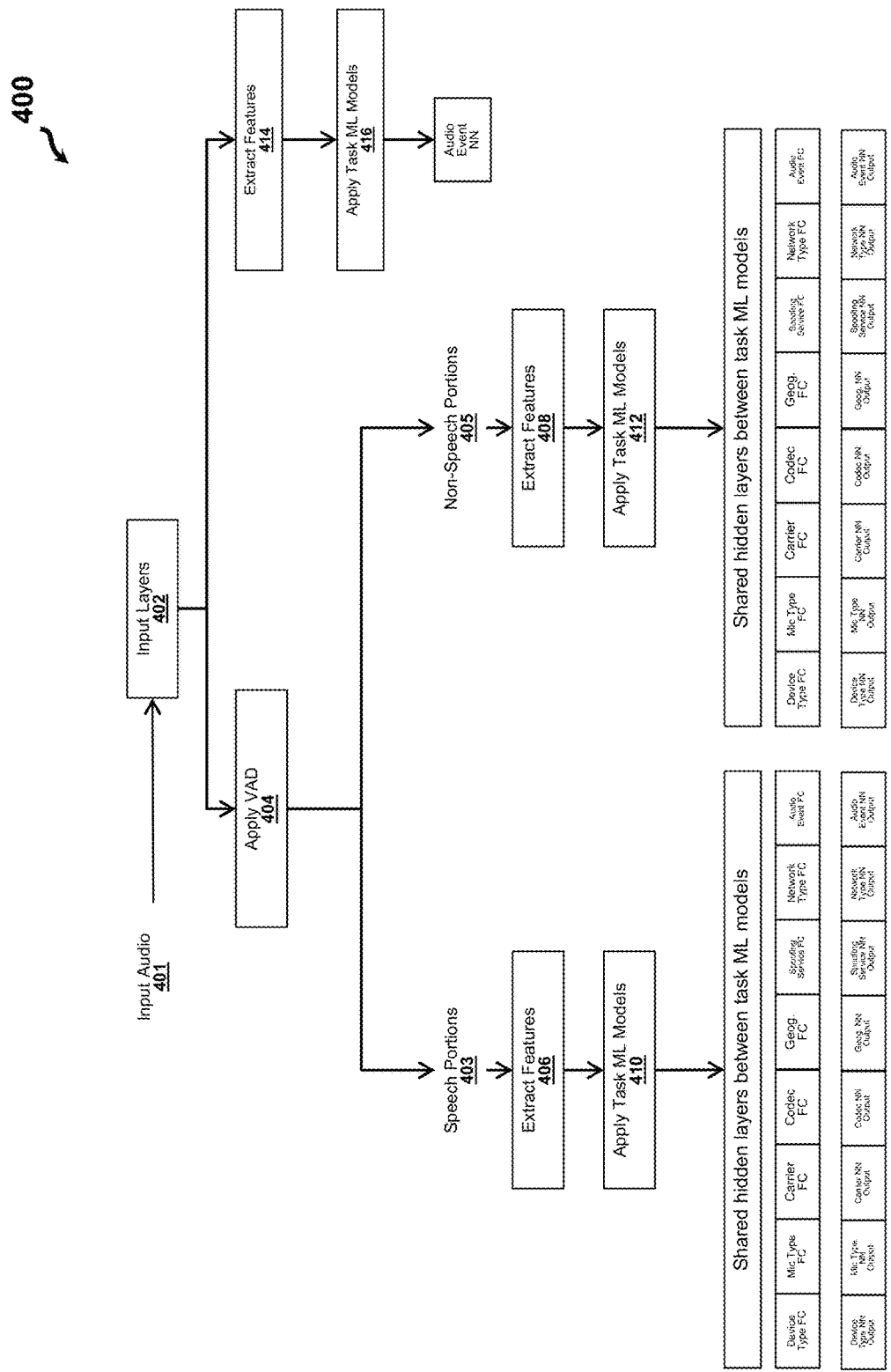
FIG. 4 shows execution steps of a multi-task learning method for training a neural network architecture for speaker-independent embeddings, according to an embodiment.

FIG. 4 shows execution steps of a multi-task learning method 400 for training a neural network architecture for speaker-independent embeddings. Embodiments may include additional, fewer, or different operations than those described in the method 400. The method 400 is performed by a server executing machine-readable software code of the neural network architecture, though the various operations may be performed by one or more computing devices and/or processors.

In the multi-task learning method 400, the server trains only two task-specific models (e.g., speech, non-speech) or three task-specific models (e.g., speech, non-speech, full audio signal) for multi-task learning, rather than separately training and developing the task-specific models (as in the signal task configuration of method 300 of FIG. 3). In the multi-task learning method 400, the neural network architecture comprises shared hidden layers (e.g., embedding extraction layers) that are shared by (and common to) multiple task-specific models, such that the hidden layers generate feature vectors for the given portions 403, 405 of the audio signal. In addition, the input audio signal 401 (or speech portions 403 and non-speech portions 405 thereof) are shared by the task-specific models. The neural network architecture comprises a single final loss function that is a weighted sum of single task losses. The shared hidden layers are followed by separate, task-specific fully connected (FC) layers and task-specific output layers. In the multi-task learning method 400, the server executes the single loss function across all task-specific models.

In step 402, input layers of the neural network architecture ingest an input audio signal 401, which include training audio signals for the training phase or enrollment audio signals for the enrollment phase. The input layers perform various pre-processing operations on the input audio signal 401 (e.g., training audio signal, enrollment audio signal) prior to feeding the input audio signal 401 into various other layers of the neural network architecture. The pre-processing operations include, for example, applying a VAD operation, extracting various types of features (e.g., MFCCs, metadata), and performing a data transform operation.

In some embodiments, the input layers perform various data augmentation operations during the training or enrollment phase. The data augmentation operations may generate or retrieve certain training audio signals, including clean audio signals and noise samples. The server may receive or request clean audio signals from one or more corpora databases. The clean audio signals may include audio signals originating from various types of audio sources having varied speaker-independent characteristics. The clean audio signals may be stored in non-transitory storage media accessible to the server or received via a network or other data source. The data augmentation operations may further receive simulated audio signals from one or more database or generate simulated audio signals based upon the clean audio signals or input audio signals 401 by applying various forms of data augmentation on the input audio signals 401 or clean audio signals. Examples of data augmentation techniques are described in U.S. patent application Ser. No. 17/155,851, which is incorporated by reference in its entirety.

In step 404, the server applies the VAD on the input audio signals 401. The neural network layers of the VAD detect occurrences of speech windows non-speech windows of the input audio signal 401. The VAD parses the input audio signals 401 into speech portions 403 and non-speech portions 405. The VAD includes classification layers (e.g., classifier), which the server trains separately or jointly with the other layers of the neural network architecture. The VAD may directly output binary results (e.g., speech, non-speech) for portions of the input signal 401 or generate contentious values (e.g., probabilities) for each portion of the input audio signal 401 that the server evaluates against a speech detection threshold to output the binary results for the given portion. The VAD generates a set of speech portions 403 and a set of non-speech portions 405 parsed by the VAD from the input audio signal 401.

In step 406, the server extracts features from the set of speech portions 403, and in step 408, the server extracts the corresponding features from the set of non-speech portions 405. The server performs various pre-processing operations on the portions 403, 405 of the input audio signal 401 in order to, for example, extract various types of features from the portions 403, 405, and transform one or more extracted features from a time-domain representation into a frequency-domain representation by performing an SFT or FFT operation.

The server and neural network architecture of the method 400 are configured to extract features related to the speaker-independent characteristics of the input audio signal 401, though in some embodiments, the server is further configured to extract features related to speaker-dependent characteristics that depend upon the speech.

In step 410, the server applies the task-specific models on the speech portions 403 to jointly train the neural network architecture for the speech portions 403. Task-specific models share hidden layers for modeling and generating a joint feature vector based upon the speech portions of the particular input audio signal 401. Each task-specific model comprises fully-connected layers and output layers that are distinct from the fully-connect layers and output layers of the other task-specific models and that independently influence the particular loss function. In the current step 410, a shared loss function evaluates outputs related to the speech portions 403. For instance, the loss function may be a sum, concatenation, or other algorithmic combination of the several output layers processing the speech portions 403.

In particular, the server receives the input audio signals 401 (e.g., training audio signals, enrollment audio signals) along with one or more labels that indicating certain aspects of the particular input audio signal 401, such as an expected classifications, expected features, expected feature vectors, expected metadata, and a type or degree of degradation present in the input audio signal 401, among other aspects. The shared hidden layers (e.g., embedding extraction layers) generate feature vectors based upon the features extracted from the speech portions 403. During the training phase (and, in some cases, during the enrollment phase), the fully-connected and output layers (e.g., classifier layers) of each task-specific model determines a predicted classification for the speech portions 403 based upon the common feature vectors generated by the shared hidden layers for the speech portion 403. The server performs the common loss function to determine a level of error according to, for example, the differences between one or more predicted speech outputs (e.g., predicted feature vectors, predicted classifications) and one or more expected speech outputs (e.g., expected feature vectors, expected classifications) indicated by the labels associated with the particular input audio signals 401. The shared loss function or other operational layer of the neural network architecture adjusts one or more hyper-parameters of the neural network architecture until the level of error satisfies a threshold degree of error.

Similarly, in step 412, the server applies the shared hidden layers (e.g., embedding extraction layers) and the task-specific models on the non-speech portions 405. The embedding extraction layers generate a non-speech feature vector based upon the features extracted from the non-speech portions 405. During the training phase (and, in some cases, during the enrollment phase), the fully-connect layers and the output layers (e.g., classification layers) of each task-specific model generate predicted non-speech outputs (e.g., predicted feature vectors, predicted classifications) for the non-speech portions 405 based upon the non-speech feature vectors generated by the shared hidden layers. The server performs the shared loss function to determine the level of error based upon the differences between predicted non-speech outputs (e.g., predicted feature vectors, predicted classifications) and expected non-speech outputs (e.g., expected feature vectors, expected classification) according to the labels associated with the particular input audio signals 401. The shared loss function or other operational layer of the neural network architecture adjusts one or more hyper-parameters of the neural network architecture until the level of error satisfies a threshold degree of error.

In step 414, the server extracts features from an entire input audio signal 401. The server performs various pre-processing operations on the input audio signal 401 in order to, for example, extract various types of features, and transform certain extracted features from a time-domain representation into a frequency-domain representation by performing SFT or FFT functions.

In step 416, the server applies hidden layers (e.g., embedding extraction layers) on the features extracted (in step 414). The hidden layers are shared by certain task-specific models that evaluate the entire input audio signal 401 (e.g., audio event neural network). The embedding extraction layers generate whole-audio feature vectors based upon the features extracted from the input audio signal 401. During the training phase (and, in some cases, during the enrollment phase), fully-connect layers and output layers (e.g., classification layers) unique to each particular task-specific model generate a predicted whole-audio output (e.g., predicted classification, predicted whole-audio feature vector) according to the whole-audio feature vectors. The server performs a shared loss function to determine a level of error based upon the differences between the predicted whole-audio outputs (e.g., predicted feature vectors, predicted classifications) and expected whole-audio outputs (e.g., expected feature vectors, expected classifications) indicated by the labels associated with the particular input audio signal 401. The shared loss function or other operational layer of the neural network architecture adjusts one or more hyper-parameters of the neural network architecture until the level of error satisfies a threshold degree of error.

Extracting Speaker-Independent Embeddings and DP Vector

Figure 5:
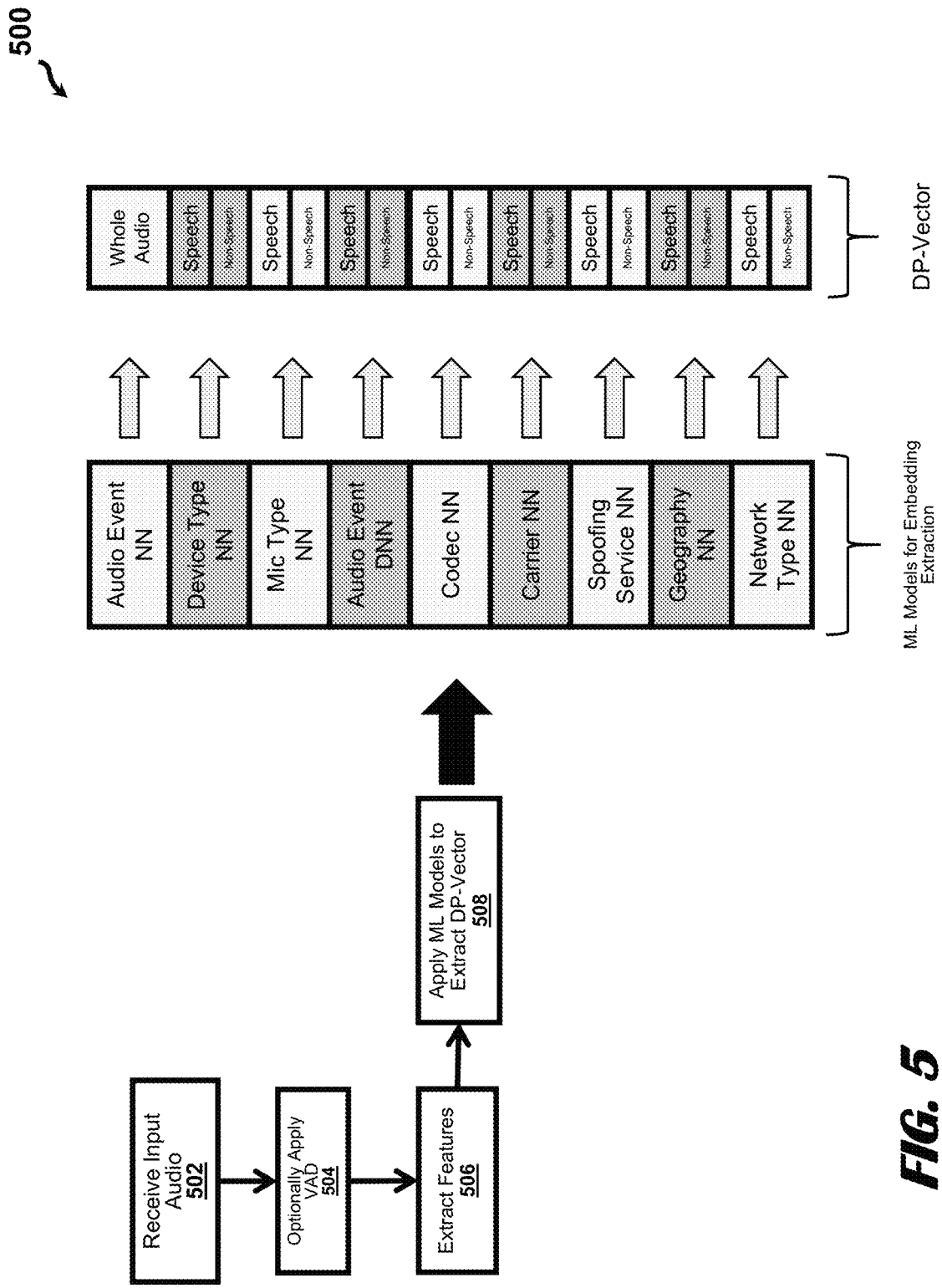
FIG. 5 shows execution steps of a method for applying task-specific models of a neural network architecture and extracting speaker-independent embeddings and a DP vector for an input audio signal, according to an embodiment.

FIG. 5 shows execution steps of a method 500 for applying task-specific models of a neural network architecture and extracting speaker-independent embeddings and a DP vector for an input audio signal. Embodiments may include additional, fewer, or different operations than those described in the method 500. The method 500 is performed by a server executing machine-readable software code of the neural network architectures, though the various operations may be performed by one or more computing devices and/or processors.

In step 502, the server receives the input audio signal (e.g., training audio signal, enrollment audio signal, inbound audio signal) from a particular audio source. The server may perform any number pre-processing and/or data augmentation operation on the input audio signal before feeding the input audio signal into the neural network architecture.

In step 504, the server optionally applies a VAD on the input audio signal. The neural network layers of the VAD detect occurrences of speech windows or non-speech windows of the input audio signal. The VAD parses the input audio signal into speech portions and non-speech portions. The VAD includes classification layers (e.g., classifier), which the server trains separately or jointly with the other layers of the neural network architecture. The VAD may directly output binary results (e.g., speech, non-speech) for portions of the input signal or generate contentious values (e.g., probabilities) for each portion of the input audio signal that the server evaluates against a speech detection threshold to output the binary results for the given portion. The VAD generates a set of speech portions and a set of non-speech portions parsed by the VAD from the input audio signal.

In step 506, the server extracts various features from the input audio signal. The extracted features may include low-level spectro-temporal features (e.g., MFCCs) and communications metadata, among other types of data. The features are associated with the set of speech portions, the set of non-speech portions, and the full audio signal.

In step 508, the server applies the neural network architecture to the input audio signal. In particular, the server applies the task-specific models to the features extracted from the speech portions to generate a first set of speaker-independent feature vectors corresponding to each of the task-specific models. The server again applies the task-specific models to the features extracted from the non-speech portions to generate a second set of speaker-independent feature vectors corresponding to each of the task-specific models. The server also applies whole-audio task-specific models (e.g., audio event neural network) to the entire input audio signal.

In a single-task configuration, each task-specific model comprises distinct modeling layers for generating the feature vectors. In a multi-task configuration, shared hidden layers generate the feature vectors and a shared loss layer adjusts the hyper-parameters, though each task-specific model comprises a distinct set of post-modeling layers, such as fully-connected layers, classification layers, and/or output layers. In either configuration, the fully-connected layers of each particular task-specific model statistically or algorithmically combine the feature vectors to extract one or more corresponding speaker-independent embeddings. For example, the audio event neural network extracts a whole-audio embedding based upon one or more whole-audio feature vectors, whereas the device neural network extracts a speech embedding and then extracts a non-speech feature vector based upon one or more speech feature vectors and one or more non-speech feature vectors.

After extracting the speaker-independent embeddings from the input audio signal, the server then extracts the DP vector for the audio source based on the extracted speaker-independent embeddings. In particular, the server algorithmically combines the extracted embeddings from each of the task-specific models to generate the DP vector.

As shown in FIG. 5, the neural network architecture includes nine task-specific models that extract the speaker-independent embeddings. The server applies the audio event neural network on the full input audio signal to extract the corresponding speaker-independent embedding. The server also applies each of the remaining eight task-specific models to the speech portions and the non-speech portions. The server extracts a pair of speaker-independent embeddings outputted by each of the task-specific models: a first speaker-independent embedding for the speech portions and a second speaker-independent embedding for the non-speech portions. In this example, the server extracts eight of the first speaker-independent embeddings and eight of the second speaker-independent embeddings. The server then extracts the DP vector for the input audio signal by concatenating the speaker-independent embeddings. In the example of FIG. 5, the DP vector is produced by concatenating the 17 speaker-independent embeddings outputted by the nine task-specific models.

Additional Embodiments

Speaker-Independent DP Vector Complementary to Voice Biometrics

A deep-phoneprinting system may be employed for authentication operations for audio features and/or metadata associated with audio signals. The DP vector or the speaker-independent embeddings may be evaluated as a complement to voice biometrics.

In a voice biometric system, at a training phase, an input audio signal is pre-processed using a VAD to parse voice-only portions of the audio. A discriminatory DNN model is trained on the voice-only portions of input audio signal using one or more speaker labels. At feature extraction, the audio signal is passed through the VAD to extract one or more features of the voice-only portion of the audio. The audio is ingested as an input to the DNN model to extract speaker embedding vectors (e.g., voiceprints), which represent the speaker characteristics of the input audio signal.

In a DP system, at the training phase, the audio is processed using the VAD to parse both voice-only portions and non-voice portions of the input audio signal. The voice-only portions of the audio are used to train a set of DNN models using a set of metadata labels. The non-speech portions of the audio are then used to train another set of DNN models using the same set of metadata labels. In some implementations, the metadata labels are unrelated to speaker labels. Because of the differences, the DP vector generated by the DP system adds complementary information about the speaker-independent aspects of the audio to the voice biometric system. The DP vector captures information that is complementary to the features extracted in voice biometric system, such that the neural network architecture can employ speaker-embeddings (e.g., voiceprint) and the DP vector in various voice biometric operations, such as authentication. The fusion systems described herein can be employed for various downstream operations, such as authenticating an audio source associated with input audio signals or creating and enforcing an audio-based exclusion list.

Figure 6:
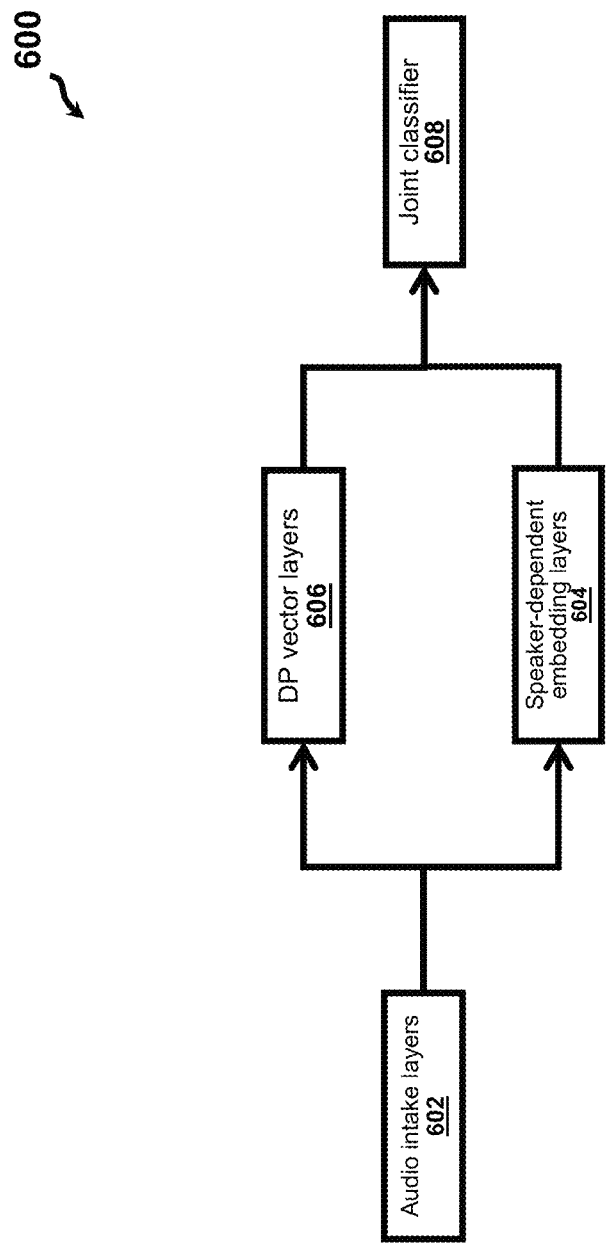
FIG. 6 shows a diagram showing data flow among layers of a neural network architecture that employs DP vectors as a complement to speaker-dependent embeddings, according to an embodiment.

FIG. 6 is a diagram showing data flow among layers of a neural network architecture 600 that employs DP vectors as a complement to speaker-dependent embeddings. The DP vector may be fused with the speaker-dependent embeddings either at a "feature level" or at a "score level." In feature-level fusion embodiments, the DP vector is concatenated or otherwise algorithmically combined with speaker-dependent embeddings (e.g., voiceprint), thereby generating a joint embedding. The concatenated joint feature vector is then used to train a machine learning classifier for classification tasks and/or employed in any number of downstream operations. The neural network architecture 600 is executed by a server during a training phase and optional enrollment and deployment phases, though the neural network architecture 600 may be executed by any computing device comprising a processor capable of performing the operations of the neural network architecture 600 and by any number of such computing devices.

Audio intake layers 602 receive one or more input audio signals (e.g., training audio signals, enrollment audio signals, inbound audio signal) and perform various pre-processing operations, including applying a VAD on an input audio signal and extracting various types of features. The VAD detects speech portions and non-speech portions and outputs a speech-only audio signal and a speechless-only audio signal. The intake layers 602 may also extract the various types of features from the input audio signal, the speech-only audio signal, and/or the speechless-only audio signal.

Speaker-dependent embedding layers 604 are applied on the input audio signal to extract the speaker-dependent embeddings (e.g., voiceprint). The speaker-dependent embedding layers 604 include embedding extraction layers for generating feature vectors according to the extracted features that are used for modeling the speaker-dependent aspects of the input audio signal. Examples of extracting such speaker-dependent embeddings have been described U.S. patent application Ser. Nos. 17/066,210 and 17/079,082, which are incorporated by reference herein.

Sequentially or simultaneously, DP vector layers 606 are applied on the input audio signal. The DP vector layers include task-specific models that extract various speaker-independent embeddings from the input audio signal. The DP vector layers 606 then extract the DP vector for the input audio signal by concatenating (or otherwise combining) the various speaker-independent embeddings.

Neural network layers defining a joint classifier 608 are applied to a joint embedding to output a classification or other output indicating the classification. The DP vector and the speaker-dependent embeddings are concatenated or otherwise algorithmically combined to generate the joint embedding. The concatenated joint embedding is then used to train the joint classifier for classification tasks or any number of downstream operations that employ the classification determinations. During a training phase, the joint classifier outputs predicted outputs (e.g., predicted classifications, predicted feature vectors) for training audio signals, which are used to determine a level of error according to training labels that indicate expected outputs. The hyper-parameters of the joint classifier 608 and other layers of the neural network architecture 600 to minimize the level of error.

Figure 7:
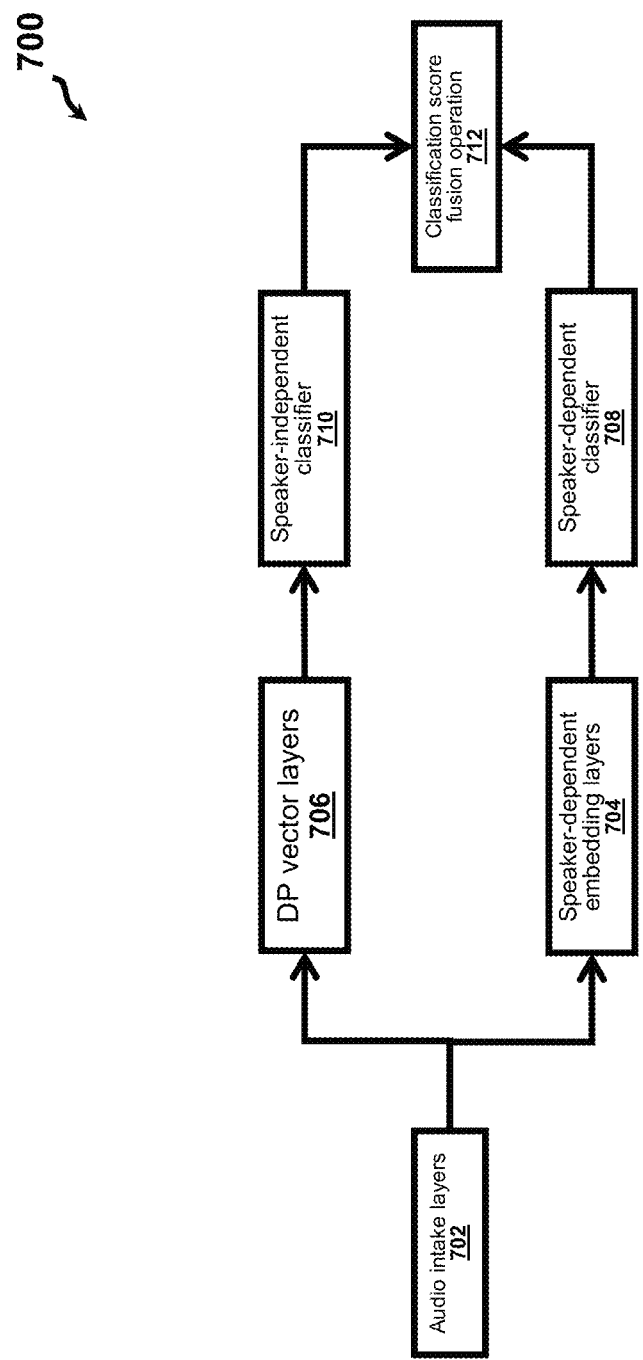
FIG. 7 shows a diagram showing data flow among layers of a neural network architecture that employs DP vectors as a complement to speaker-dependent embeddings, according to an embodiment.

FIG. 7 is a diagram showing data flow among layers of a neural network architecture 700 that employs DP vectors as a complement to speaker-dependent embeddings. The neural network architecture 700 is executed by a server during a training phase and optional enrollment and deployment phases, though the neural network architecture 700 may be executed by any computing device comprising a processor capable of performing the operations of the neural network architecture 700 and by any number of such computing devices.

In score-level fusion embodiments, as in FIG. 7, one or more DP vectors are used to train a speaker-independent classifier 708 and the speaker-dependent embeddings are used to train a speaker-dependent classifier 710. The two types of classifiers 708, 710 independently generate predicted classifications (e.g., predicted classification labels, predicted probabilities for classifications) for the corresponding types of embeddings. Classification score-fusion layers 712 algorithmically combine the prediction labels or probabilities using, for example, an ensemble algorithm (e.g., Logistic Regression model) to output a joint prediction.

Audio intake layers 702 receive one or more input audio signals (e.g., training audio signals, enrollment audio signals, inbound audio signal) and perform various pre-processing operations, including applying a VAD on an input audio signal and extracting various types of features. The VAD detects speech portions and non-speech portions and outputs a speech-only audio signal and a speechless-only audio signal. The intake layers 702 may also extract the various types of features from the input audio signal, the speech-only audio signal, and/or the speechless-only audio signal.

Speaker-dependent embedding layers 704 are applied on the input audio signal to extract the speaker-dependent embeddings (e.g., voiceprint). The speaker-dependent embedding layers 704 include embedding extraction layers for generating feature vectors according to the extracted features that are used for modeling the speaker-dependent aspects of the input audio signal. Examples of extracting such speaker-dependent embeddings have been described in U.S. application Ser. Nos. 17/066,210 and 17/079,082, which are incorporated by reference herein.

Sequentially or simultaneously, DP vector layers 706 are applied on the input audio signal. The DP vector layers include task-specific models that extract various speaker-independent embeddings from the input audio signal. The DP vector layers 706 then extract the DP vector for the input audio signal by concatenating (or otherwise combining) the various speaker-independent embeddings.

Neural network layers defining a speaker-dependent classifier 708 are applied to the speaker-dependent embedding to output a speaker classification (e.g., genuine, fraudulent) or other output indicating the speaker classification. During a training phase, the speaker-dependent classifier 708 generates predicted outputs (e.g., predicted classifications, predicted feature vectors, predicted DP vector) for training audio signals, which are used to determine a level of error according to training labels that indicate the expected outputs. The hyper-parameters of the speaker-dependent classifier 708 or other layers of the neural network architecture 700 are adjusted by the loss function or other function of the server to minimize the level of error for the speaker-dependent classifier 708.

Neural network layers defining a speaker-independent classifier 710 are applied to the DP vector to output a speaker classification (e.g., genuine, fraudulent) or other output indicating the speaker classification. During the training phase, the speaker-independent classifier 710 generates predicted outputs (e.g., predicted classifications, predicted feature vectors, predicted DP vector) for training audio signals, which are used to determine a level of error according to training labels that indicate the expected outputs. The loss function or other function executed by the server adjusts the hyper-parameters of the speaker-independent classifier 710 or other layers of the neural network architecture 700 to minimize the level of error for the speaker-independent classifier 710.

The server performs a classification score-fusion operation 712 based upon the outputted classification scores or determinations produced by the speaker-dependent classifier 708 and the speaker-independent classifier 710. In particular, each classifier 708, 710 independently generate the respective classification outputs (e.g., classification labels, classification probability values). The classification score-fusion operation 712 algorithmically combines the predicted outputs using, for example, an ensemble algorithm (e.g., Logistic Regression model) to output a joint embedding.

Speaker-Independent DP Vector for Exclusion Lists

Figure 8:
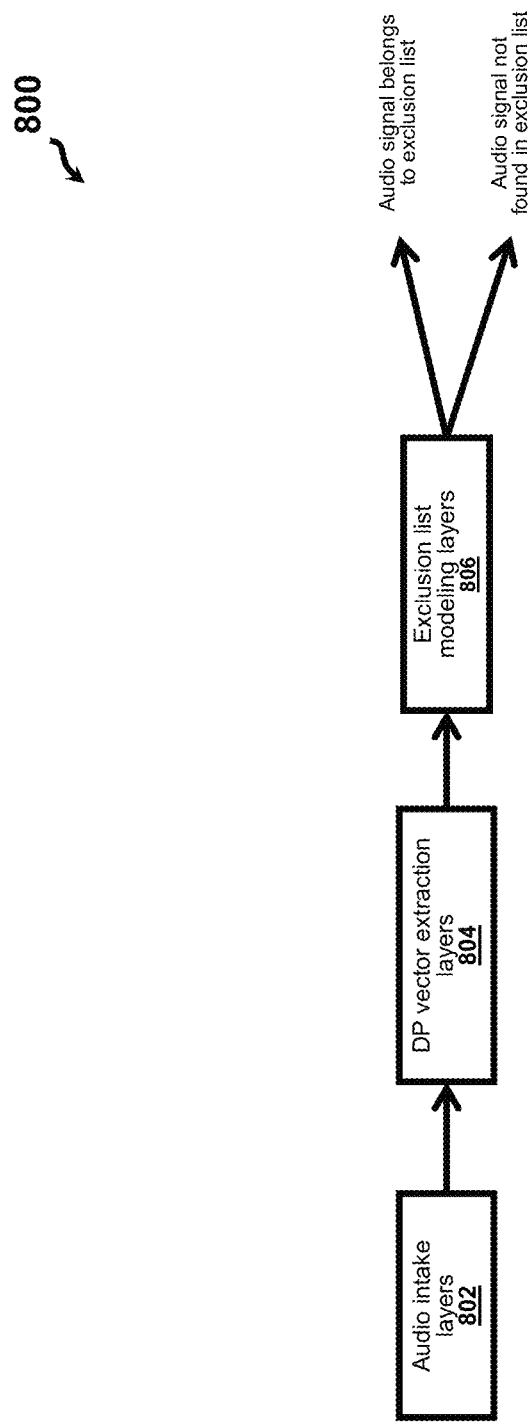
FIG. 8 shows a diagram showing data flow among layers of a neural network architecture employing DP vectors for authenticating audio sources according to an exclusion list and/or permissive list, according to an embodiment.

FIG. 8 is a diagram showing data flow among layers of a neural network architecture 800 employing DP vectors for authenticating audio sources according to an exclusion list and/or permissive list. The exclusion list may operate as a denial list (sometimes called a "blacklist") and/or a permissive list (sometimes called a "whitelist"). In authentication operation, the exclusion list is used to exclude and/or permit certain audio sources. The neural network architecture 800 is executed by a server during a training phase and optional enrollment and deployment phases, though the neural network architecture 800 may be executed by any computing device comprising a processor capable of performing the operations of the neural network architecture 800 and by any number of such computing devices.

In particular, a DP vector can be referenced to create and/or enforce an exclusion list. The DP vectors are extracted from input audio signals (e.g., training audio signals, enrollment audio signals, inbound audio signals) for the various operational phases. The DP vectors are associated with the audio sources that are part of the exclusion list and the audio associated with the normal population. The machine learning model is trained on DP vectors using labels. At the test time this model predicts on the new sample audio to determine if the audio belongs to the exclusion list or not.

Audio intake layers 802 receive one or more input audio signals (e.g., training audio signals, enrollment audio signals, inbound audio signal) and perform various pre-processing operations, including applying a VAD on an input audio signal and extracting various types of features. The VAD detects speech portions and non-speech portions and outputs a speech-only audio signal and a speechless-only audio signal. The intake layers 802 may also extract the various types of features from the input audio signal, the speech-only audio signal, and/or the speechless-only audio signal.

DP vector layers 804 are applied on the input audio signal. The DP vector layers include task-specific models that extract various speaker-independent embeddings from the input audio signal. The DP vector layers 804 then extract the DP vector for the input audio signal by concatenating (or otherwise combining) the various speaker-independent embeddings.

Exclusion list modeling layers 806 are applied to the DP vector. The exclusion list modeling layers 806 are trained to determine whether an audio source that originated the input audio signal is on the exclusion list. The exclusion list modeling layers 806 determines a similarity score based on a relative distance (e.g., similarity, difference) between the DP vector of the input audio signal and DP vectors of audio sources in the exclusion list. During the training phase, the exclusion list modeling layers 806 generate predicted outputs (e.g., predicted classifications, predicted similarity score) for training audio signals, which are used to determine a level of error according to training labels that indicate the expected outputs. The hyper-parameters of the exclusion list modeling layers 806 or other layers of the neural network architecture 800 to minimize the level of error for the exclusion list modeling layers 806.

As an example, the neural network architecture 800 employs a fraudulent exclusion list applied against inbound audio sources. The training audio signals, $X=\{x_1, x_2, x_3 \ldots x_n\}$, are associated with corresponding training labels, $Y=\{y_1, y_2, y_3, \ldots y_n\}$, where each label ($y_i$) indicates the classification {FRAUD, GENUINE} for the corresponding training audio signal ($x_i$). The DP vectors ($v_i$) are extracted from the input audio signals ($x_i$) to extract the corresponding DP vectors, $V=\{v_1, v_2, v_3, \ldots v_n\}$. The modeling layers 806 are trained on the DP vectors using the labels. At test time, the trained modeling layers 806 determines a classification score based upon a similarity or likelihood score that an inbound audio signal is within a threshold distance to the DP vector of the inbound audio signal.

DP Vector for Authentication

Figure 9:
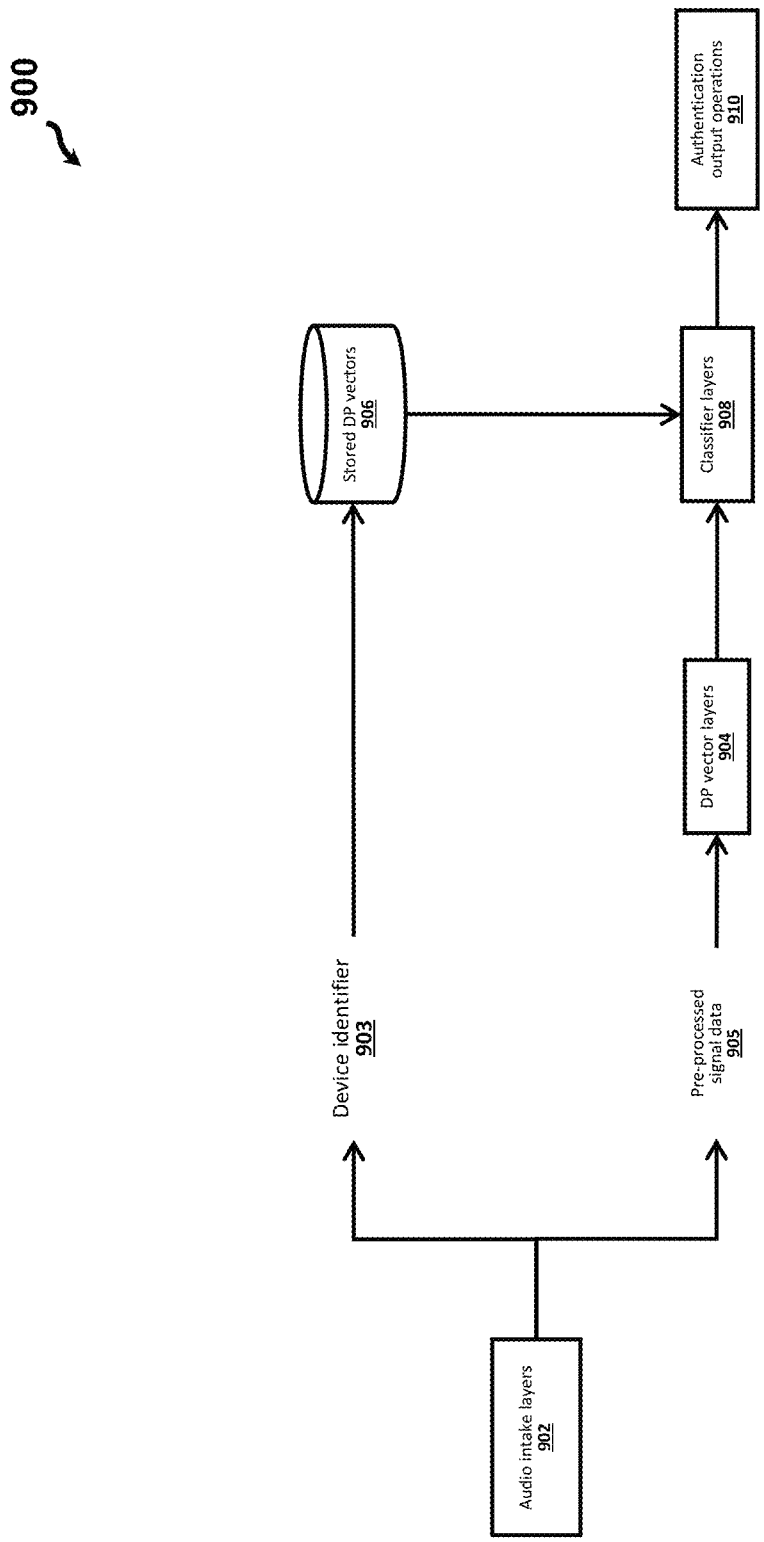
FIG. 9 shows a diagram showing data flow among layers of a neural network architecture employing DP vectors for authenticating device using device identifiers, according to an embodiment.

FIG. 9 is a diagram showing data flow among layers of a neural network architecture 900 employing DP vectors for authenticating device using device identifiers. The neural network architecture 900 is executed by a server during a training phase and optional enrollment and deployment phases, though the neural network architecture 900 may be executed by any computing device comprising a processor capable of performing the operations of the neural network architecture 900 and by any number of such computing devices.

The authentication embodiments may enroll an audio source entity with a device ID or source ID, where the DP vector used to enroll the audio source is stored into a database as a stored DP vector. At test time, each audio source associated with the device ID should be authenticated (or rejected) based upon algorithmic comparisons between inbound DP vectors and stored DP vectors associated with the device ID of the inbound audio device.

Audio intake layers 902 receive one or more input audio signals (e.g., training audio signals, enrollment audio signals, inbound audio signal) and perform various pre-processing operations, including applying a VAD on an input audio signal and extracting various types of features. The VAD detects speech portions and non-speech portions and outputs a speech-only audio signal and a speechless-only audio signal. The intake layers 902 may also extract the various types of features from the input audio signal, the speech-only audio signal, and/or the speechless-only audio signal.

The audio intake layers 902 include identifying a device identifier (device ID 903) associated with the input audio signal and audio source. The device ID 903 may be any identifier associated with the originated device or audio source. For example, if the originating device is a telephone, then the device ID 903 may be an ANI or telephone number. If the originated device is an IoT device, then the device ID 903 is a MAC address, IP address, computer name, or the like.

The audio intake layers 902 also perform various pre-processing operations (e.g., feature extraction, VAD operations) on the input audio signals to output pre-processed signal data 905. The pre-processed signal data 905 includes, for example, the speech-only signals, the speechless-only signals, and various types of extracted features.

DP vector layers 904 are applied on the input audio signal. The DP vector layers include task-specific models that extract various speaker-independent embeddings from the pre-processed signal data 905 and substantially all of the input audio signal. The DP vector layers 904 then extract the DP vector for the input audio signal by concatenating (or otherwise combining) the various speaker-independent embeddings.

The server additionally queries a database containing stored DP vectors 906 using the device ID 903. The server identifies one or more stored DP vectors 906 in the database associated with the device ID 903.

Classifier layers 908 determine a similarity score based upon a relative distance (e.g., similarities, differences) between the DP vector extracted for the inbound audio signal and a stored DP vector 906. The classifier layers 908 authenticate the originating device as a bona fide enrolled device in response to determining that the similarity score satisfies an authentication threshold score. Any type of metric could be used to compute the similarity between stored vectors and the inbound DP vector. Non-limiting examples of potential similarity calculations may include Probabilistic Linear Discriminant Analysis (PLDA) similarity, Inverse of Euclidean distance, or Inverse of Manhattan distance, among others.

The server performs one or more authentication output operations 910 based upon the similarity score generated by the classifier layers 908. The server may, for example, connect the originating device to a destination device (e.g., provider server) or agent telephone, in response to authenticating the originating device.

DP Vector for the Audio Quality Measurement

A DP vector can be created by concatenating embeddings of different speaker-independent aspects of the audio signal. The speaker-independent aspects, such as microphone type used to capture an audio signal, codecs used to compress and decompress an audio signal, audio events (e.g., background noise present in the audio), provides valuable information about the quality of the audio. The DP vector may be employed to represent the audio quality measurement based on the speaker-independent aspects, which may be employed in various downstream operations, such as an authentication system.

In an authentication system (e.g., voice biometric system), for example, it is important to enroll speaker embeddings that are extracted from a good quality audio. If the audio signal contains a high level of noise, the quality of the speaker embedding might be negatively affected. Similarly, audio-related artifacts produced by the device and microphone may reduce the quality of the audio for an enrollment embedding. Moreover, high energy audio events (e.g., overwhelming noise) may be present in the input audio signal, such as a crying baby, barking dogs, music, or the like. These high energy audio events are evaluated as voice portions by a VAD applied on the audio signals. This badly affects the quality of the speaker embedding extracted from the audio signal for enrollment purposes. If the bad quality speaker embeddings are enrolled and stored into the authentication system, the enrolled speaker embedding may negatively affect the performance of the overall authentication system. The DP vector can be used to characterize the quality of the audio using either rule-based thresholding technique or using machine learning model as binary classifier.

Figure 10:
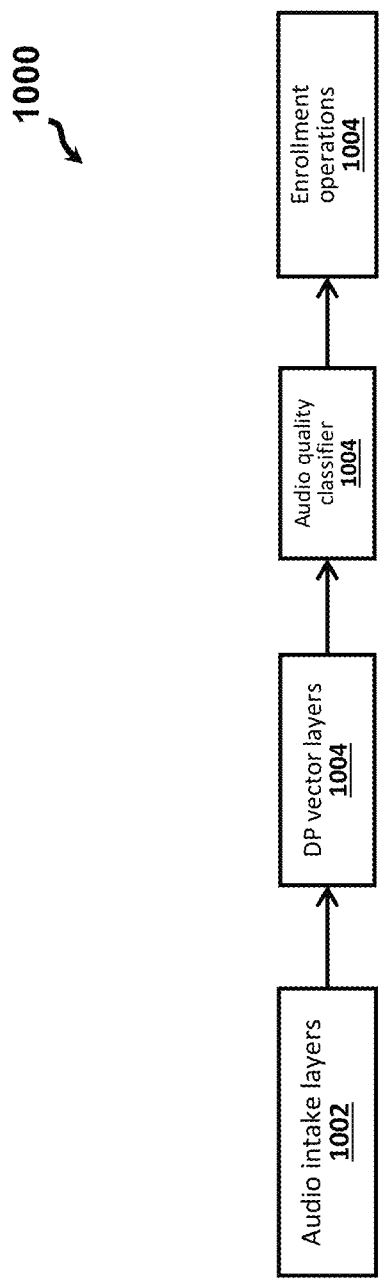
FIG. 10 shows a diagram showing data flow among layers of a neural network architecture employing deep-phone-printing for dynamic enrollment, according to an embodiment.

FIG. 10 is a diagram showing data flow among layers of a neural network architecture 1000 employing deep-phone-printing for dynamic enrollment, whereby a server determines whether to enroll or not enroll based on audio quality. The neural network 1000 is executed by the server during a training phase and optional enrollment and deployment phases, though the neural network architecture 1000 may be executed by any computing device comprising a processor capable of performing the operations of the neural network architecture 1000 and by any number of such computing devices.

Audio intake layers 1002 receive one or more enrollment audio signals and perform various pre-processing operations, including applying a VAD on an input audio signal and extracting various types of features. The VAD detects speech portions and non-speech portions and outputs a speech-only audio signal and a speechless-only audio signal. The intake layers 1002 may also extract the various types of features from the v audio signal, the speech-only audio signal, and/or the speechless-only audio signal.

DP vector layers 1006 are applied on the enrollment audio signal. The DP vector layers include task-specific models that extract various speaker-independent embeddings from the enrollment audio signal. The DP vector layers 1006 then extract the DP vector for the enrollment audio signal by concatenating (or otherwise combining) the various speaker-independent embeddings. The DP vector represents the quality of the enrollment audio signal. The sever applies layers of an audio quality classifier, which generates a quality score and makes a binary classification determination whether to use the particular enrollment audio signal to generate a enrolled speaker embedding based upon an enrollment quality threshold.

The server performs various enrollment operations 1004, such as generating, storing or updating an enrolled speaker embedding, in response to determining that the quality satisfies the enrollment quality threshold.

DP Vector for Replay Attack Detection

Figure 11:
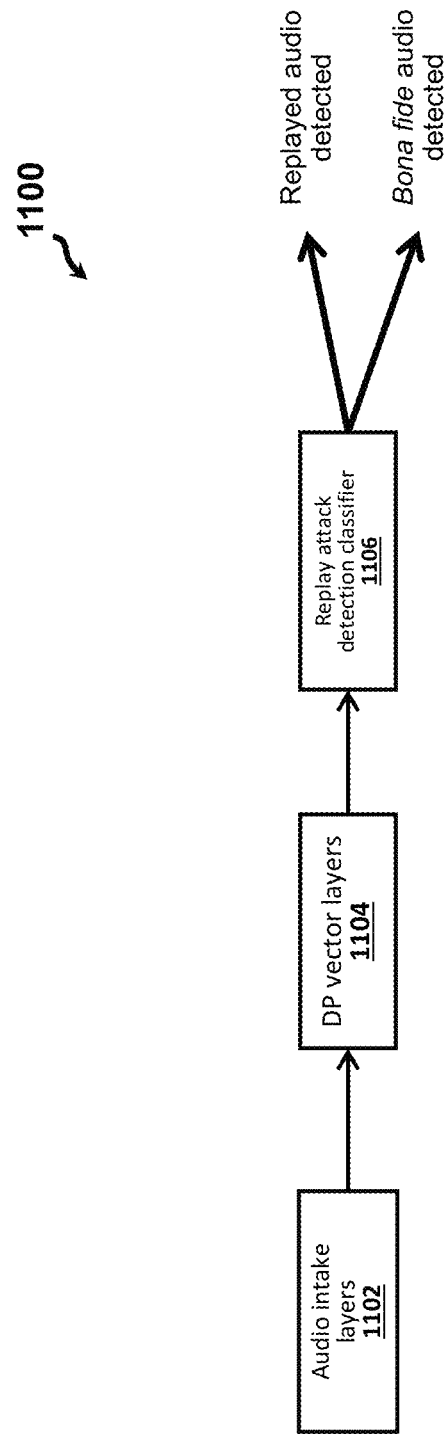
FIG. 11 shows a diagram showing data flow of a neural network architecture for employing DP vectors to detect replay attacks, according to an embodiment.

FIG. 11 is a diagram showing data flow of a neural network architecture 1100 for employing DP vectors to detect replay attacks. The neural network architecture 1100 is executed by a server during a training phase and optional enrollment and deployment phases, though the neural network 1100 may be executed by any computing device comprising a processor capable of performing the operations of the neural network architecture 1100 and by any number of such computing devices. The neural network architecture 1100 need not always perform operations of an enrollment phase. As such, in some embodiments, the neural network architecture 1100 includes the training and deployment phases.

Automatic speaker verification (ASV) systems are popularly used as a reliable solution for person authentication. However, ASV systems are vulnerable to voice spoofing. Voice spoofing can be either Logical Access (LA) or Physical Access (PA). The Text To Speech (TTS) functions that generate synthetic speech and voice conversion fall under the umbrella of LA. The replay attack is an example of PA spoofing. In PA scenario, speech data is assumed to be captured by a microphone in a physical and reverberant space. Replay spoofing attacks are recordings of bona fide speech, which are assumed to be captured and then re-presented to the microphone of an ASV system using a replay device. Replayed speech is assumed to be first captured with a recording device before being replayed using a non-linear replay device.

Audio intake layers 1102 receive one or more input audio signals (e.g., training audio signals, enrollment audio signals, inbound audio signal) and perform various pre-processing operations, including applying a VAD on an input audio signal and extracting various types of features. The VAD detects speech portions and non-speech portions and outputs a speech-only audio signal and a speechless-only audio signal. The intake layers 1102 may also extract the various types of features from the input audio signal, the speech-only audio signal, and/or the speechless-only audio signal.

DP vector layers 1104 are applied on the input audio signal. The DP vector layers include task-specific models that extract various speaker-independent embeddings from the input audio signal. The DP vector layers 1104 then extract the DP vector for the input audio signal by concatenating (or otherwise combining) the various speaker-independent embeddings.

As device type and microphone type are important speaker-independent aspects used by a deep phoneprinting system to detect replay attacks using a DP vector. For this, during a training phase, DP vectors are extracted from one or more corpora of training audio signals that are also used for training speaker embeddings, which includes simulated audio signals having various forms of degradation (e.g., additive noise, reverberation). The DP vector layers 1104 are applied to the training audio signals that include simulated audio signals.

A replay attack detection classifier 1106 determines a detection score indicating a likelihood that an inbound audio signal is a replay attack. A binary classification model of the replay attack detection classifier 1106 is trained on the training data and labels. At test time, the replay attack detection classifier 1106 model outputs an indication whether the neural network architecture 1100 has detected in the inbound audio a replay attack or a bona fide audio signal.

DP Vector for Spoof Detection

In recent years, there is a rise of Voice over IP (VoIP) services because of their cost effectiveness. The VoIP services, such as Google Voice or Skype, use a virtual phone number also known as direct inward dialing (DID) or access number, which is a phone number that is not directly associated with a telephone line. These phone numbers are also called gateway numbers. When the user makes a call over VoIP service it may present one common gateway number or a number from the set of gateway numbers as a caller ID, which is not necessarily unique to the device or caller. Some of the VoIP services enable loopholes such as deliberate caller ID/ANI spoofing where a caller can deliberately falsify the information transmitted to the receiver's caller ID display to disguise their identity. There are multiple caller ID/ANI spoofing services available in the form of an Android and IOS applications.

The deep phoneprinting system has a component for spoofing service classification. The embeddings extracted from a DNN model trained for ANI spoofing service classification tasks can be used for spoofing service recognition on the new audio. These embeddings can be also used for spoof detection by considering all ANI spoofing services as the spoofed class.

Figure 12:
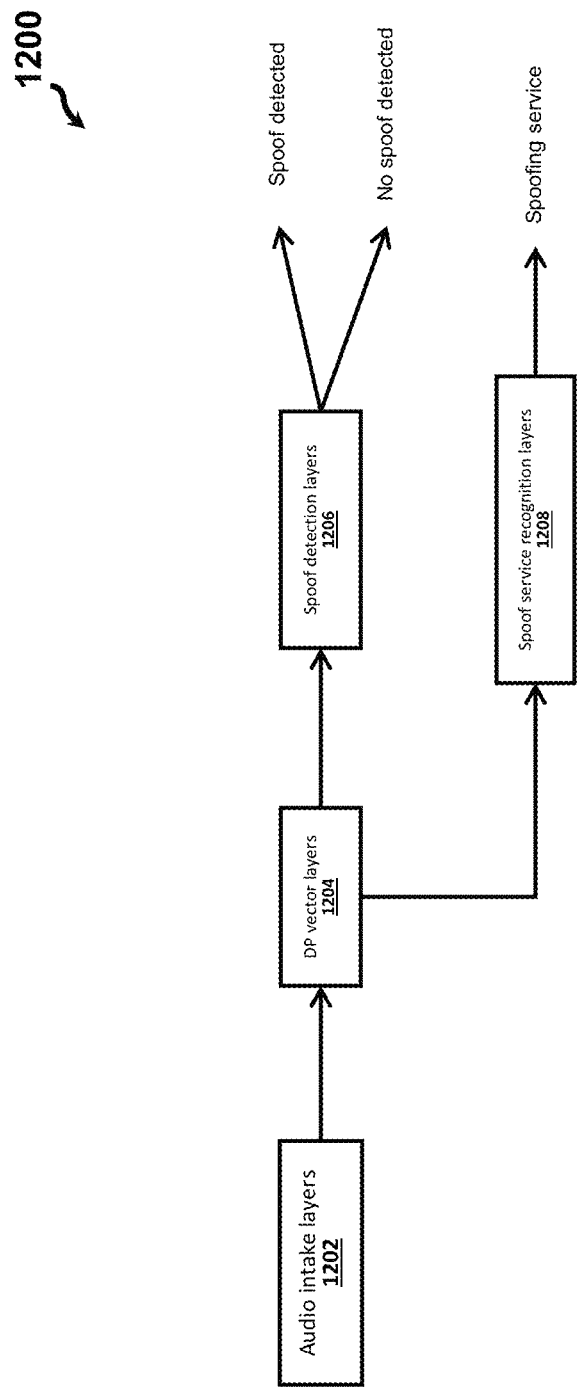
FIG. 12 shows a diagram showing data flow among layers of a neural network architecture employing DP vectors to identify spoofing services associated with audio signals, according to an embodiment.

FIG. 12 is a diagram showing data flow among layers of a neural network architecture 1200 employing DP vectors to identify spoofing services associated with audio signals. The neural network architecture 1200 is executed by a server during a training phase and optional enrollment and deployment phases, though the neural network architecture 1200 may be executed by any computing device comprising a processor capable of performing the operations of the neural network architecture 1200 and by any number of such computing devices. The neural network architecture 1200 need not always perform operations of an enrollment phase. As such, in some embodiments, the neural network architecture 1200 includes the training and deployment phases.

Audio intake layers 1202 receive one or more input audio signals (e.g., training audio signals, enrollment audio signals, inbound audio signal) and perform various pre-processing operations, including applying a VAD on an input audio signal and extracting various types of features. The VAD detects speech portions and non-speech portions and outputs a speech-only audio signal and a speechless-only audio signal. The intake layers 1202 may also extract the various types of features from the input audio signal, the speech-only audio signal, and/or the speechless-only audio signal.

DP vector layers 1204 are applied on the input audio signal. The DP vector layers include task-specific models that extract various speaker-independent embeddings from the input audio signal. The DP vector layers 1204 then extract the DP vector for the input audio signal by concatenating (or otherwise combining) the various speaker-independent embeddings.

Spoof detection layers 1206 define a binary classifier trained to determine a spoof detection likelihood score. The spoof detection layers 1206 are trained to determine whether an audio source is spoofing an input audio signal (spoof detection) or that no spoofing has been detected. The spoof detection layers 1206 determines a likelihood score based on a relative distance (e.g., similarity, difference) between the DP vector of the input audio signal and DP vectors of trained spoof detection classifications or stored spoof detection DP vectors. During the training phase, the spoof detection layers 1206 generate predicted outputs (e.g., predicted classifications, predicted similarity score) for training audio signals, which are used to determine a level of error according to training labels that indicate the expected outputs. The loss function or other server-executed process adjusts the hyper-parameters of the spoof detection layers 1206 or other layers of the neural network architecture 1200 to minimize the level of error for the spoof detection layers 1206. The spoof detection layers 1206 determine whether a given inbound audio signal, at test time, has a spoof detection likelihood score that satisfies a spoof detection threshold.

Where the neural network architecture 1200 has detected spoofing in the inbound audio signal, the neural network architecture applies spoofing service recognition layers 1208. The spoofing service recognition layers 1208 is a multi-class classifier trained to determine a likely spoofing service used to generate the spoofed inbound signal. The spoof service recognition layers 1208 determines a spoofing service likelihood score based on a relative distance (e.g., similarity, difference) between the DP vector of the input audio signal and DP vectors of trained spoof service recognition classifications or stored spoof service recognition DP vectors. During the training phase, the spoofing service recognition layers 1208 generate predicted outputs (e.g., predicted classifications, predicted similarity score) for training audio signals, which are used to determine a level of error according to training labels that indicate the expected outputs. The hyper-parameters of the spoofing service recognition layers 1208 or other layers of the neural network architecture 1200 to minimize the level of error for the spoofing service recognition layers 1208. The spoofing service recognition layers 1208 determine the particular spoofing service applied to generate the spoofed inbound audio signal at test time, where a spoofing service likelihood score satisfies a spoof detection threshold.

Figure 13:
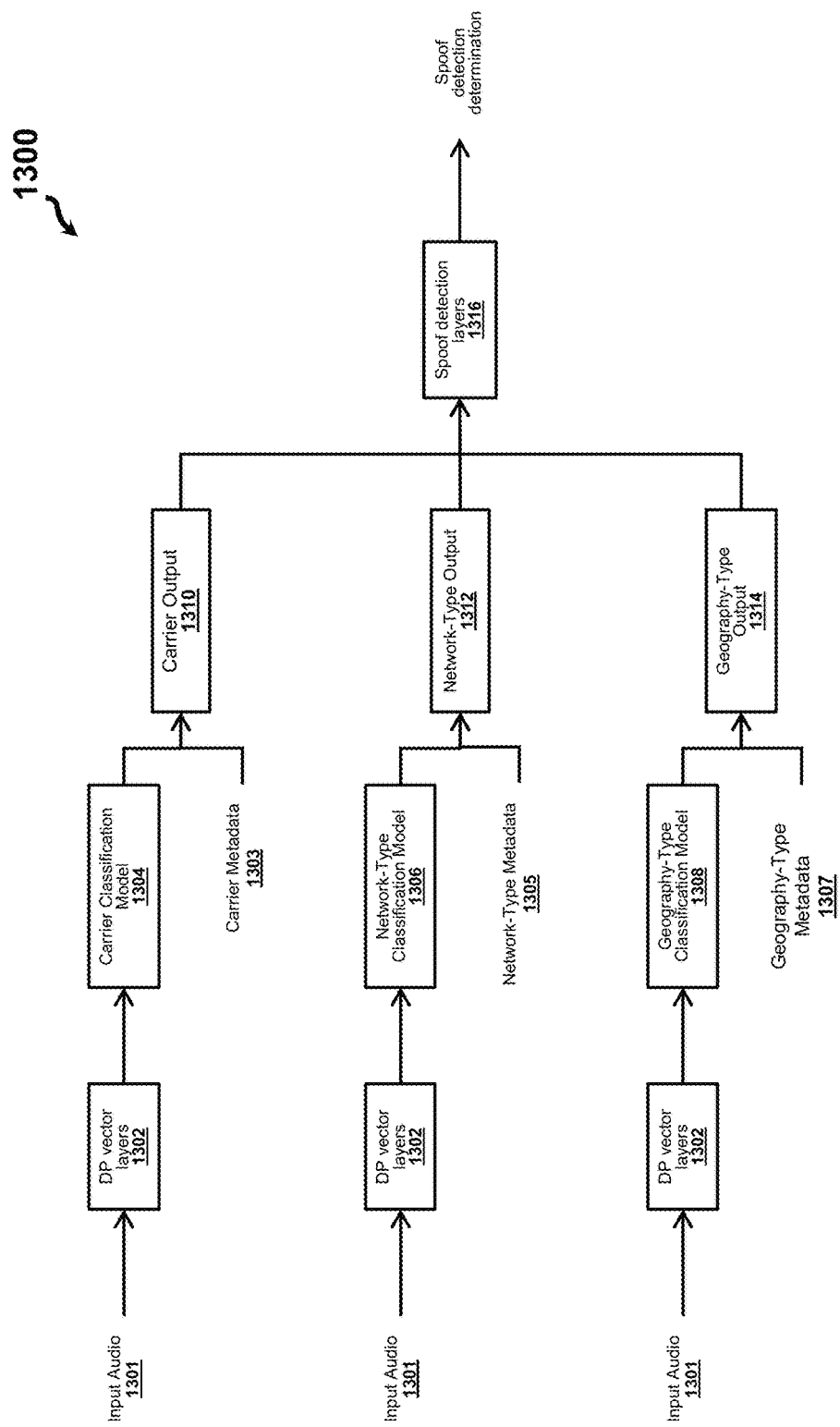
FIG. 13 shows a diagram showing data flow among layers of a neural network architecture for employing DP vectors to identify spoofing services associated with audio signals according to a label mismatch approach, according to an embodiment.

FIG. 13 is a diagram showing data flow among layers of a neural network architecture 1300 for employing DP vectors to identify spoofing services associated with audio signals according to a label mismatch approach. The neural network architecture 1300 is executed by a server during a training phase and optional enrollment and deployment phases, though the neural network architecture 1300 may be executed by any computing device comprising a processor capable of performing the operations of the neural network architecture 1300 and by any number of such computing devices. The neural network architecture 1300 need not always perform operations of an enrollment phase. As such, in some embodiments, the neural network architecture 1300 includes the training and deployment phases.

Audio intake layers receive one or more input audio signals 1301 and perform various pre-processing operations, including applying a VAD on an input audio signal and extracting various types of features. The VAD detects speech portions and non-speech portions and outputs a speech-only audio signal and a speechless-only audio signal. The intake layers may also extract the various types of features from the input audio signal 1301, the speech-only audio signal, and/or the speechless-only audio signal.

DP vector layers 1302 are applied on the input audio signal 1301. The DP vector layers include task-specific models that extract various speaker-independent embeddings from the input audio signal. The DP vector layers 1302 then extract the DP vector for the input audio signal 1301 by concatenating (or otherwise combining) the various speaker-independent embeddings.

The deep phoneprinting system executing the neural network architecture 1300 has components based on speaker-independent aspects, such as carrier, network type, and geography, among others. The DP vector can be used to train one or more label classification models 1304, 1306, 1308 for speaker-independent embeddings for each of these speaker-independent aspects. At the test time, when the DP vectors extracted from an inbound audio signal are given as input to the classification models 1304, 1306, 1308 to predict the various types of labels, such as carrier, network type, and geography, among others. For example, for inbound audio signals received via a telephone channel, a phone number or ANI of the originating audio source can be used to gather or determine certain metadata, such as carrier, network type, or geography, among others. The classification models 1304, 1306, 1308 may detect a mismatch between a predicted classification label based on the DP vector and the metadata associated with the ANI. The output layers 1310, 1312, 1314 feed the corresponding classifications of the classification models 1304, 1306, 1308 as inputs into a spoof detection layers 1316.

In some implementations, the classification models 1304, 1306, 1308 may be classifiers or other types of neural network layers (e.g., fully-connected layers) of respective task-specific models. Similarly, in some implementations, the output layers 1310, 1312, 1314 may be layers of respective task-specific models.

The spoof detection layers 1316 define a binary classifier trained to determine a spoof detection likelihood score based on classification scores or labels received from the particular output layers 1310, 1312, 1314. The spoof detection layers 1316 are trained to determine whether an audio source is spoofing the input audio signal 1310 (spoofing detected) or that no spoofing has been detected. The spoof detection layers 1316 determine a likelihood score based on a relative distance (e.g., similarity, difference) between the DP vector 1302 of the input audio signal 1301 and DP vectors of trained spoof detection classifications, scores, clusters, or stored spoof detection DP vectors. During the training phase, the spoof detection layers 1316 generate predicted outputs (e.g., predicted classifications, predicted similarity score) for training audio signals, which are used to determine a level of error according to training labels that indicate the expected outputs. The loss function (or other function executed by the server) adjusts the hyper-parameters of the spoof detection layers 1316 or other layers of the neural network architecture 1300 to minimize the level of error for the spoof detection layers 1316. The spoof detection layers 1316 determine whether a given inbound audio signal 1301, at test time, has a spoof detection likelihood score that satisfies a spoofing detection threshold.

DP Vector for Speaker-Independent Characteristic Classifications

Figure 14:
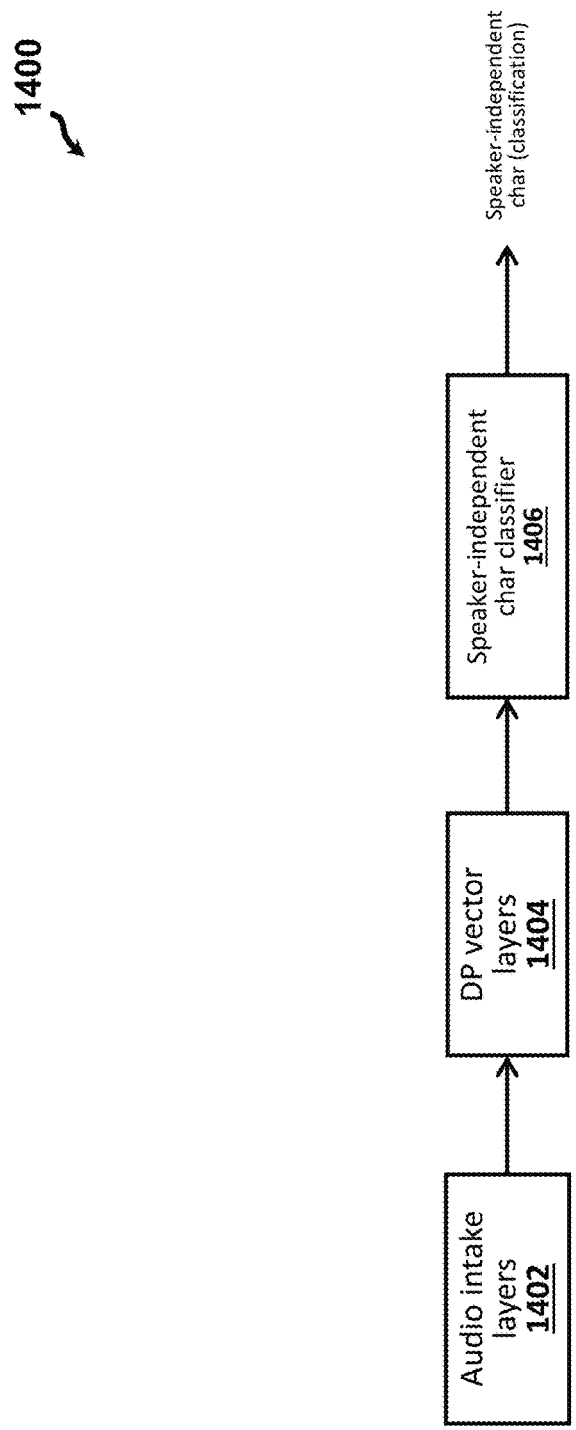
FIG. 14 shows a diagram showing data flow among layers of a neural network architecture employing a DP vector for determining a microphone-type associated with audio signals, according to an embodiment.

FIG. 14 is a diagram showing data flow among layers of a neural network architecture 1400 employing a DP vector for determining a microphone-type associated with audio signals. The neural network architecture 1400 is executed by one or more computing devices, such as a server, using various types of input audio signals (e.g., training, audio signals, enrollment audio signals, inbound audio signals) and various other types of data, such as training labels. The neural network architecture 1400 comprises audio intake layers, DP vector layers 1404, and classifier layers 1406.

The audio intake layers 1402 ingest the input audio signal and perform one or more pre-processing operations on the input audio signal. The DP vector layers 1404 extract a plurality of speaker-independent embedding for various types of speaker-independent characteristics and extract a DP vector for the inbound audio signal based upon the speaker-independent embeddings. The classifier 1406 generates a classification score (or other type of score) based upon the DP vector of the inbound signal and various types of stored data used for classification (e.g., stored embeddings, stored DP vectors), along with any number of additional outputs related to the classification outcome.

The DP vector can be used for recognizing the type of microphone used for capturing the input audio signal at an originating device. The microphone is a transducer that converts the sound impulses into electrical signals. There are several types of microphones used for various purposes such as dynamic microphone, condenser microphone, piezoelectric microphone, MicroElectrical-Mechanical System (MEMS) microphone, ribbon microphone, carbon microphone, etc. The microphones respond to the sound differently based on direction. The microphones have different polar patterns such as Omni-directional, bi-directional and uni-directional, and they have proximity effects. The distance from audio source to microphone and direction of source has a significant effect on microphone response. For telephony, while making audio phone calls, the user may use different kinds of microphones, such as traditional landline receivers, speakerphones, microphones in mobile phones, wired headset with microphone, wireless microphone, and the like. For IoT devices (e.g., Alexa®, Google Home®), as a microphone array is used which has onboard direction detection, noise cancellation and echo cancellation capabilities. The microphone array uses beamforming principle to improve quality of the audio captured. The neural network architecture 1400 can recognize, or be trained to recognize, the microphone type can be recognized by evaluating the DP vector of the inbound audio signal against trained classifications, clusters, pre-stored embeddings, and the like.

The DP vector can be used for recognizing the type of device that captured the input audio signal. For telephony, there are several types of devices used. There are several phone device manufactures which produce different types of telephones. For example, Apple produces iPhone and the iPhone has several models such as iPhone 8, iPhone X, iPhone 11 to name a few, Samsung produces Samsung Galaxy series, etc.

For IoT, there is a large variety of devices involved starting from voice based assistance devices, such as Amazon Echo with Alexa, Google Home, smart phones, smart refrigerators, smart watches, smart fire alarms, smart door locks, smart bicycles, medical sensors, fitness trackers, smart security system, and the like. Recognizing the type of device from which an audio is captured adds valuable information about the audio.

The DP vector can be used for recognizing the type of codec used for capturing the input audio signal at an originating device. An audio codec is a device or a computer program that is capable of encoding and decoding audio data stream or audio signal. The codec is used to compress the audio at one end before transmission or storage and then decompress it at the receiving end. There are several types of codec used in telephony audio. For example, G.711, G.721, G729, Adaptive Multi-Rate (AMR), Enhanced Variable Rate Codec (EVRC) for CDMA networks, GSM used in GSM based cell phones, SILK used for Skype, WhatsAPP, Speex used in VoIP apps, iLBC used open source VoIP apps, etc.

The DP vector can be used for recognizing a carrier (e.g., AT&T, Verizon Wireless, T-Mobile, Sprint) associated with the transmitting the input audio signal and/or associated with the originating device. The carrier is a component of the telecommunication system that transmits information such as voice signals and protocol metadata. The carrier networks distribute massive quantities of data over long distances. The carrier systems typically transmit multiple channels of communication simultaneously over the shared medium using various forms of multiplexing.

The DP vector can be used for recognizing geography associated with the originating device. The DP vector can be used to recognize geographic location of the audio source. The geographical location could be of broad classification, such as domestic or international, specific continents, countries, states/provinces, or cities/counties.

The DP vector can be used for recognizing a type of network associated with the transmitting the input audio signal and/or associated with the originating device. Generally, there are three classes of telephony networks: public switched telephone networks (PSTNs), cellular networks, and voice over internet protocol (VoIP) networks. The PSTNs are traditional, circuit-switched telephony systems. Similar to PSTN systems, cellular networks have a circuit-switched core, with portions currently being replaced by IP links. While these networks can have different technologies deployed in, for example, wireless interfaces, the core technologies and protocols of cellular networks are similar to PSTN networks. Lastly, VoIP networks run on top of IP links and generally share paths as other Internet-based traffic.

The DP vector can be used for recognizing an audio event within the input audio signal. Audio signals contain several types of audio events. These audio events carry information about everyday environment and physical events that occur within the environment. Recognizing such audio events and the particular classes, and detecting precise location of the audio event in the audio stream has downstream benefits offered by the deep phoneprinting system, such as searching in multimedia based on audio event, making context aware IoT devices such as mobiles, cars, intelligent monitoring in security systems based on audio events, etc. For example, during a training phase, a training audio signal may be received with a label or other metadata indicator that indicates a particular audio event in the training audio signal. This audio event indicator is used to train an audio event task-specific machine-learning model according to a classifier, fully-connected layers, regression algorithm, and/or loss function that assesses the distances between prediction outputs for the training audio signal against the expected outputs indicated by the label.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
applying, by a computer, a plurality of task-specific machine learning models on an inbound audio signal having one or more speaker-independent characteristics to extract a plurality of speaker-independent embeddings for the inbound audio signal, wherein each respective machine learning model of the plurality of task-specific machine learning models includes a classification layer disabled after training of the respective machine learning model;
extracting, by the computer, a deep phoneprint (DP) vector for the inbound audio signal based upon the plurality of speaker-independent embeddings extracted for the inbound audio signal; and
applying, by the computer, one or more post-modeling operations on the DP vector to generate one or more post-modeling outputs for the inbound audio signal.

2. The method according to claim 1, further comprising extracting, by the computer, a plurality of features from a training audio signal, the plurality of features including at least one of: a spectro-temporal feature and metadata associated with the training audio signal; and
extracting, by the computer, the plurality of features from the inbound audio signal.

3. The method according to claim 2, wherein the metadata includes at least one of: a microphone-type used to capture the training audio signal, a device type from which the training audio signal originated, a codec type applied for compression and decompression of the training audio signal for transmission, a carrier from which the training audio signal was originated, a spoofing service used to change a source identifier associated with the training audio signal, a geography associated with the training audio signal, a network type from which the training audio signal is originated, and an audio event indicator associated with the training audio signal; and
wherein one or more classifications of the one or more post-modeling outputs include at least one of: the microphone-type, the device type, the codec type, the carrier, the spoofing service, the geography, the network type and the audio event indicator.

4. The method according to claim 1, wherein a post-modeling operation of the one or more post-modeling operations includes at least one of a classification operation and a regression operation.

5. The method according to claim 1, wherein a task-specific machine learning model comprises at least one of a neural network and a Gaussian mixture model.

6. The method according to claim 1, further comprising training, by the computer, the plurality of task-specific machine learning models by applying each of the plurality of task-specific machine learning models on a plurality of training audio signals having the one or more speaker-independent characteristics.

7. The method according to claim 6, wherein training a task-specific machine learning model includes:
extracting, by the computer, one or more first spectro-temporal features for speech portions of a training audio signal and one or more second spectro-temporal features for non-speech portions of the training audio signal;
applying, by the computer, one or more modeling layers of the task-specific machine learning model on the one or more first spectro-temporal features and the one or more second spectro-temporal features to generate a first speaker-independent embedding and a second speaker-independent embedding;
generating, by the computer, predicted output data for the training audio signal by applying one or more post-modeling layers of the task-specific machine learning model on the first speaker-independent embedding and on the second speaker-independent embedding; and
adjusting, by the computer, one or more hyper-parameters of the one or more modeling layers of the task-specific machine learning model by executing a loss function using the predicted output data and expected output data indicated by one or more labels associated with the training audio signal.

8. The method according to claim 6, wherein training a task-specific machine learning model includes:
extracting, by the computer, one or more first spectro-temporal features for speech portions of a training audio signal and one or more second spectro-temporal features for non-speech portions of the training audio signal;
applying, by the computer, one or more shared modeling layers of one or more task-specific machine learning models on the one or more first spectro-temporal features and the one or more second spectro-temporal features to generate a first speaker-independent embedding and a second speaker-independent embedding;
generating, by the computer, predicted output data for the training audio signal by applying one or more post-modeling layers of the task-specific machine learning model on the first speaker-independent embedding and on the second speaker-independent embedding; and
adjusting, by the computer, one or more hyper-parameters of the task-specific machine learning model by executing a shared loss function of the one or more task-specific machine learning models using the predicted output data and expected output data indicated by one or more labels associated with the training audio signal.

9. The method according to claim 6, wherein training the plurality of task-specific machine learning models includes:
extracting, by the computer, one or more spectro-temporal features for a substantial portion of a training audio signal;
applying, by the computer, a task-specific machine learning model on the one or more spectro-temporal features of the training audio signal to generate a speaker-independent embedding;
generating, by the computer, predicted output data for the training audio signal by applying one or more post-modeling layers of the task-specific machine learning model on the speaker-independent embedding for the substantial portion of the training audio signal; and
adjusting, by the computer, one or more hyper-parameters of the task-specific machine learning model by executing a loss function using the predicted output data and expected output data indicated by one or more labels associated with the training audio signal.

10. The method according to claim 1, wherein a task-specific machine learning model comprises at least one of a convolutional neural network, recurrent neural network, and a fully connected neural network.

11. The method according to claim 1, further comprising:
executing, by the computer, a voice activity detection (VAD) operation on a training audio signal, thereby generating one or more speech portions for the training audio signal and one or more non-speech portions for the training audio signal; and
executing, by the computer, the VAD operation on the inbound audio signal, thereby generating the one or more speech portions for the inbound audio signal and the one or more non-speech portions for the inbound audio signal.

12. The method according to claim 1, further comprising:
extracting, by the computer, a plurality of enrolled speaker-independent embeddings and DP vectors for an enrolled audio source by applying the plurality of task-specific machine learning models on a plurality of enrollment audio signals associated with the enrolled audio source; and
extracting, by the computer, the DP vector for the enrolled audio source based upon the plurality of enrolled speaker-independent embeddings,
wherein the computer generates the one or more post-modeling outputs using the DP vector for the enrolled audio source and the DP vector for the inbound audio signal.

13. The method according to claim 12, further comprising determining, by the computer, an authentication classification for the inbound audio signal based upon one or more similarity scores between the DP vector for the enrolled audio source and the DP vector for the inbound audio signal.

14. A system comprising:
a database comprising non-transitory memory configured to store a plurality of audio signals having one or more speaker-independent characteristics; and
a server comprising a processor configured to:
apply a plurality of task-specific machine learning models on an inbound audio signal having the one or more speaker-independent characteristics to extract a plurality of speaker-independent embeddings for the inbound audio signal, wherein each respective machine learning model of the plurality of task-specific machine learning models includes a classification layer disabled after training of the respective machine learning model;
extract a deep phoneprint (DP) vector for the inbound audio signal based upon the plurality of speaker-independent embeddings extracted for the inbound audio signal; and
apply one or more post-modeling operations on the DP vector to generate one or more post-modeling outputs for the inbound audio signal.

15. The system according to claim 14, wherein the server is further configured to:
extract a plurality of features from a training audio signal, the plurality of features including at least one of: a spectro-temporal feature and metadata associated with the training audio signal; and
extract the plurality of features from the inbound audio signal.

16. The system according to claim 15, wherein the metadata includes at least one of: a microphone-type used to capture the training audio signal, a device type from which the training audio signal originated, a codec type applied for compression and decompression of the training audio signal for transmission, a carrier through from which the training audio signal was originated, a spoofing service used to change a source identifier associated with the training audio signal, a geography associated with the training audio signal, a network type from which the training audio signal is originated, and an audio event indicator associated with the training audio signal; and
wherein one or more classifications of the one or more post-modeling outputs include at least one of: the microphone-type, the device type, the codec type, the carrier, the spoofing service, the geography, the network type, and the audio event indicator.

17. The system according to claim 14, wherein a post-modeling operation of the one or more post-modeling operations includes at least one of a classification operation and a regression operation.

18. The system according to claim 14, wherein a task-specific machine learning model comprises at least one of a neural network and a Gaussian mixture model.

19. The system according to claim 14, wherein the server is further configured to train the plurality of task-specific machine learning models by applying each of the plurality of task-specific machine learning models on a plurality of training audio signals having the one or more speaker-independent characteristics.

20. The system according to claim 19, wherein when training a task-specific machine learning model the server is further configured to:
extract one or more first spectro-temporal features for speech portions of a training audio signal and one or more second spectro-temporal features for non-speech portions of the training audio signal;
apply one or more modeling layers of the task-specific machine learning model on the one or more first spectro-temporal features and the one or more second spectro-temporal features to generate a first speaker-independent embedding and a second speaker-independent embedding;
generate predicted output data for the training audio signal by applying one or more post-modeling layers of the task-specific machine learning model on the first speaker-independent embedding and on the second speaker-independent embedding; and
adjust one or more hyper-parameters of the one or more modeling layers of the task-specific machine learning model by executing a loss function using the predicted output data and expected output data indicated by one or more labels associated with the training audio signal.

21. The system according to claim 19, wherein when training a task-specific machine learning model the server is further configured to:
extract one or more first spectro-temporal features for speech portions of a training audio signal and one or more second spectro-temporal features for non-speech portions of the training audio signal;
apply one or more shared modeling layers of one or more task-specific machine learning models on a plurality of features on the one or more first spectro-temporal features and the one or more second spectro-temporal features to generate a first speaker-independent embedding and a second speaker-independent embedding;
generate predicted output data for the training audio signal by applying one or more post-modeling layers of the task-specific machine learning model on the first speaker-independent embedding and on the second speaker-independent embedding; and
adjust one or more hyper-parameters of the task-specific machine learning model by executing a shared loss function of the one or more task-specific machine learning models using the predicted output data and expected output data indicated by one or more labels associated with the training audio signal.

22. The system according to claim 19, wherein when training the plurality of task-specific machine learning models the server is further configured to:
one or more spectro-temporal features for a substantial portion of a training audio signal;
apply a task-specific machine learning model on the one or more spectro-temporal features of the training audio signal to generate a speaker-independent embedding;
generate predicted output data for the training audio signal by applying one or more post-modeling layers of the task-specific machine learning model on the speaker-independent embedding for the substantial portion of the training audio signal; and
adjust one or more hyper-parameters of the task-specific machine learning model by executing a loss function using the predicted output data and expected output data indicated by one or more labels associated with the training audio signal.

23. The system according to claim 14, wherein a task-specific machine learning model comprises at least one of a convolutional neural network, a recurrent neural network, and a fully connected neural network.

24. The system according to claim 14, wherein the server is further configured to:
execute a voice activity detection (VAD) operation on a training audio signal, thereby generating one or more speech portions for the training audio signal and one or more non-speech portions for the training audio signal; and
execute the VAD operation on the inbound audio signal, thereby generating the one or more speech portions for the inbound audio signal and the one or more non-speech portions for the inbound audio signal.

25. The system according to claim 14, wherein the server is further configured to:
extract a plurality of enrolled speaker-independent embeddings and DP vectors for an enrolled audio source by applying the plurality of task-specific machine learning models on a plurality of enrollment audio signals associated with the enrolled audio source; and
extract the DP vector for the enrolled audio source based upon the plurality of enrolled speaker-independent embeddings,
wherein the server generates the one or more post-modeling outputs using the DP vector for the enrolled audio source and the DP vector for the inbound audio signal.

26. The system according to claim 25, wherein the server is further configured to:
determine an authentication classification for the inbound audio signal based upon one or more similarity scores between the DP vector for the enrolled audio source and the DP vector for the inbound audio signal.

* * * * *